US008001460B2

(12) United States Patent  (10) Patent No.: US 8,001,460 B2
Itogawa et al.  (45) Date of Patent: Aug. 16, 2011

(54) PAGE-ADDED INFORMATION SHARING MANAGEMENT METHOD

(75) Inventors: Akira Itogawa, Tokyo (JP); Yoichiro Matsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 940 days.

(21) Appl. No.: 11/866,767

(22) Filed: Oct. 3, 2007

(65) Prior Publication Data

US 2008/0250081 A1  Oct. 9, 2008

(30) Foreign Application Priority Data

Oct. 11, 2006 (JP) .................................. 2006-278080
Sep. 21, 2007 (JP) .................................. 2007-245526

(51) Int. Cl.
 *G06F 17/00* (2006.01)
(52) U.S. Cl. ........................................................ 715/205
(58) Field of Classification Search .................... 715/205
 See application file for complete search history.

(56) References Cited

U.S. PATENT DOCUMENTS

| | | | |
|---|---|---|---|
| 6,877,137 B1 | 4/2005 | Rivette et al. | |
| 2001/0016872 A1 | 8/2001 | Kusuda | |
| 2003/0065706 A1* | 4/2003 | Smyth et al. | 709/200 |
| 2005/0210031 A1* | 9/2005 | Kasatani | 707/10 |
| 2006/0136589 A1* | 6/2006 | Konig et al. | 709/224 |
| 2006/0235984 A1* | 10/2006 | Kraus et al. | 709/228 |
| 2007/0038659 A1* | 2/2007 | Datar et al. | 707/101 |
| 2007/0047844 A1* | 3/2007 | Watanabe et al. | 382/305 |
| 2007/0233563 A1* | 10/2007 | Takahashi et al. | 705/14 |

FOREIGN PATENT DOCUMENTS

| | | |
|---|---|---|
| CN | 1305145 A | 7/2001 |
| JP | 2005-278161 | 10/2005 |
| WO | WO 2006/083987 A2 | 8/2006 |

OTHER PUBLICATIONS

Zhang Wen-Dong, et al., "Clustering Web user based on interest similarity", Journal of Shandong University, vol. 41, No. 3, Jun. 2006, pp. 54-57.
Office Action issued Nov. 8, 2010 in Chinese Application No. 200710306878.8 (With English Translation).

* cited by examiner

*Primary Examiner* — Doug Hutton
*Assistant Examiner* — Nathan Hillery
(74) *Attorney, Agent, or Firm* — Oblon, Spivak, McClelland, Maier & Neustadt, L.L.P.

(57) ABSTRACT

In a page-added information sharing management method, a setting of added information to an object in a page, including a range specification of the added information for the object is received. The added information is stored by associating the added information with the page. When a request for displaying the added information is received, the added information associated with the page to be viewed is acquired to provide a requesting device with the added information.

17 Claims, 34 Drawing Sheets

FIG.2
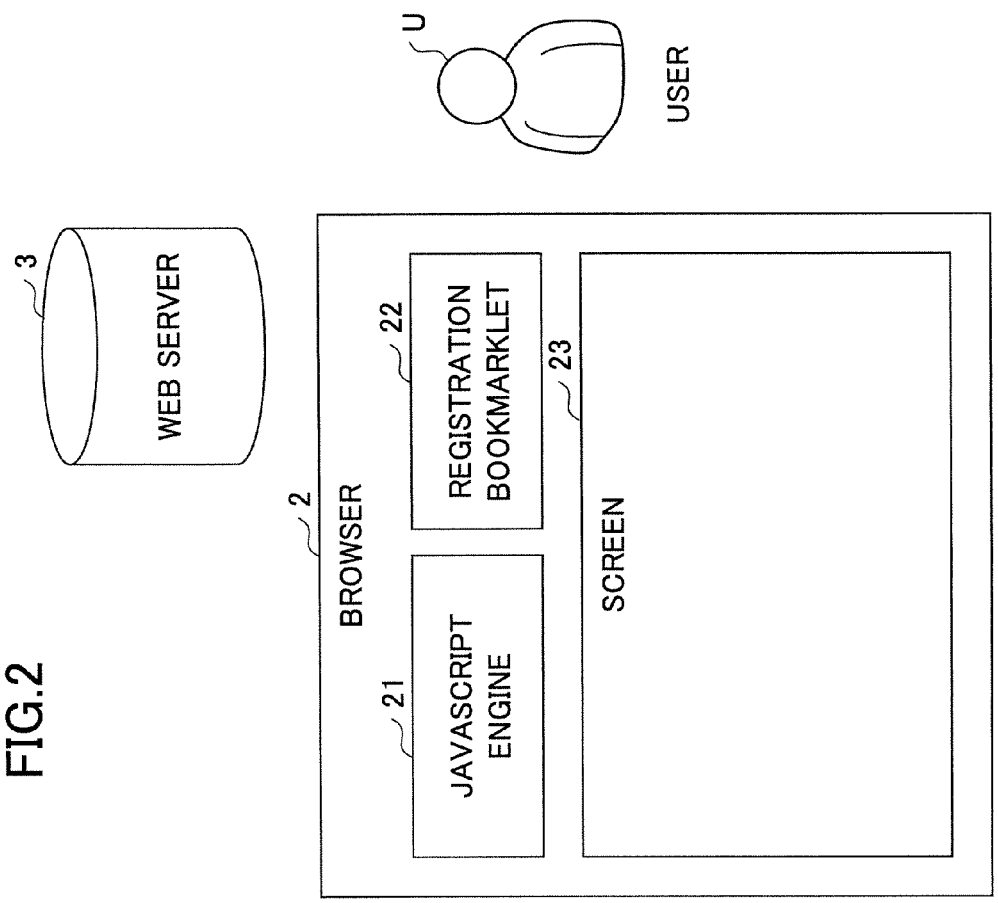
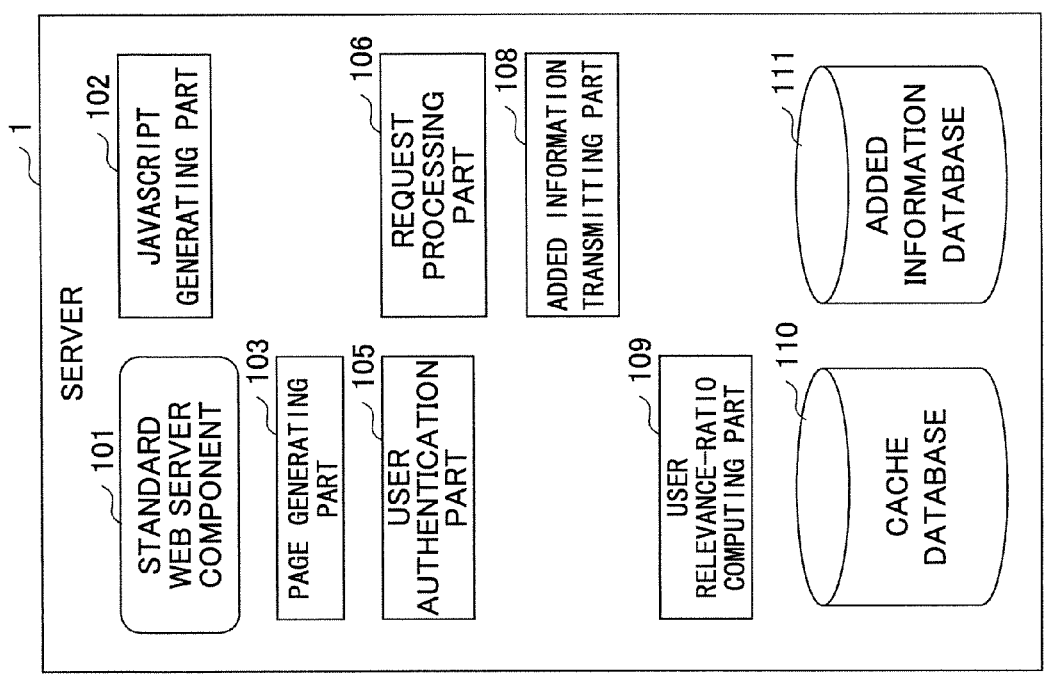

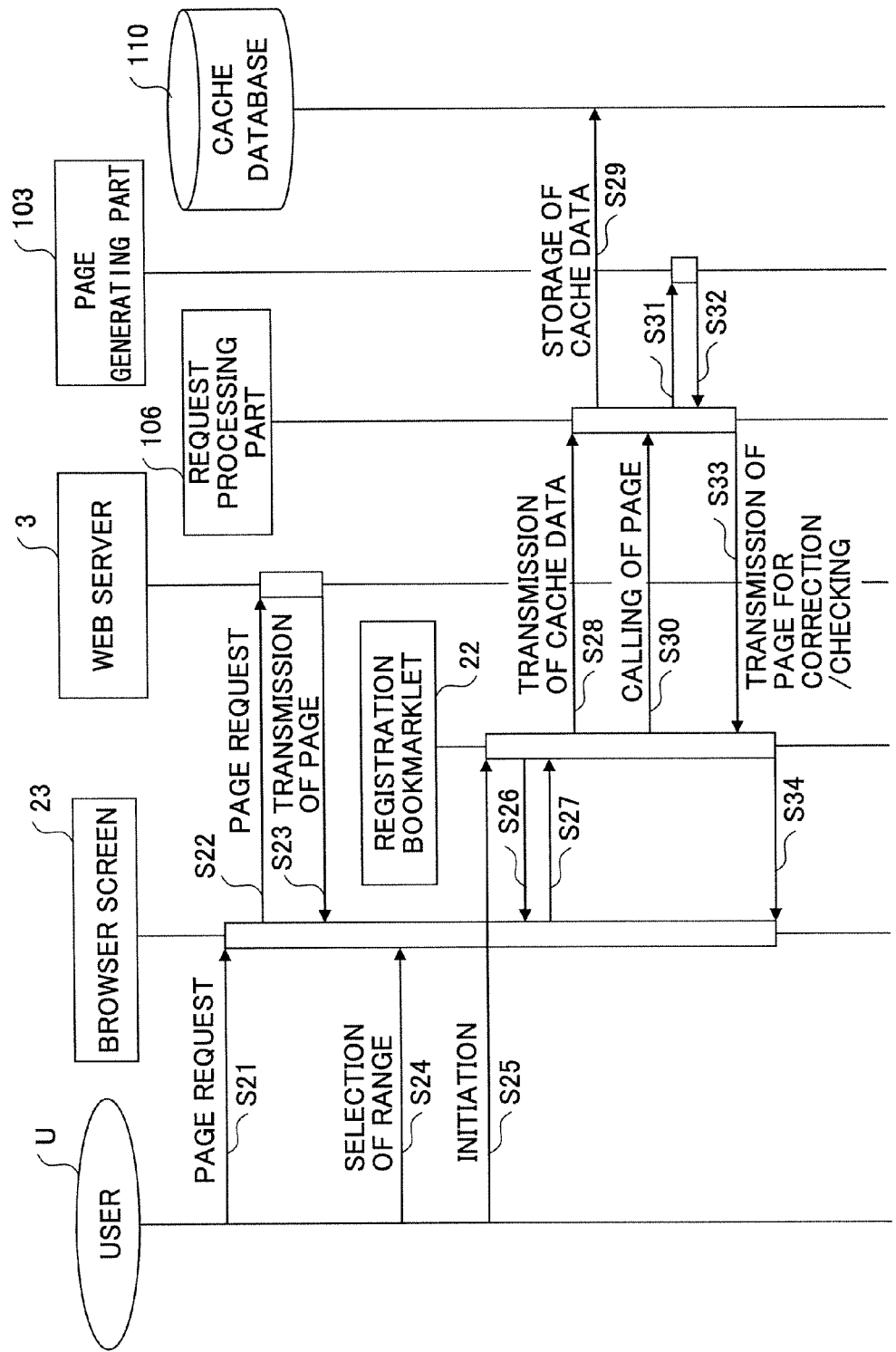

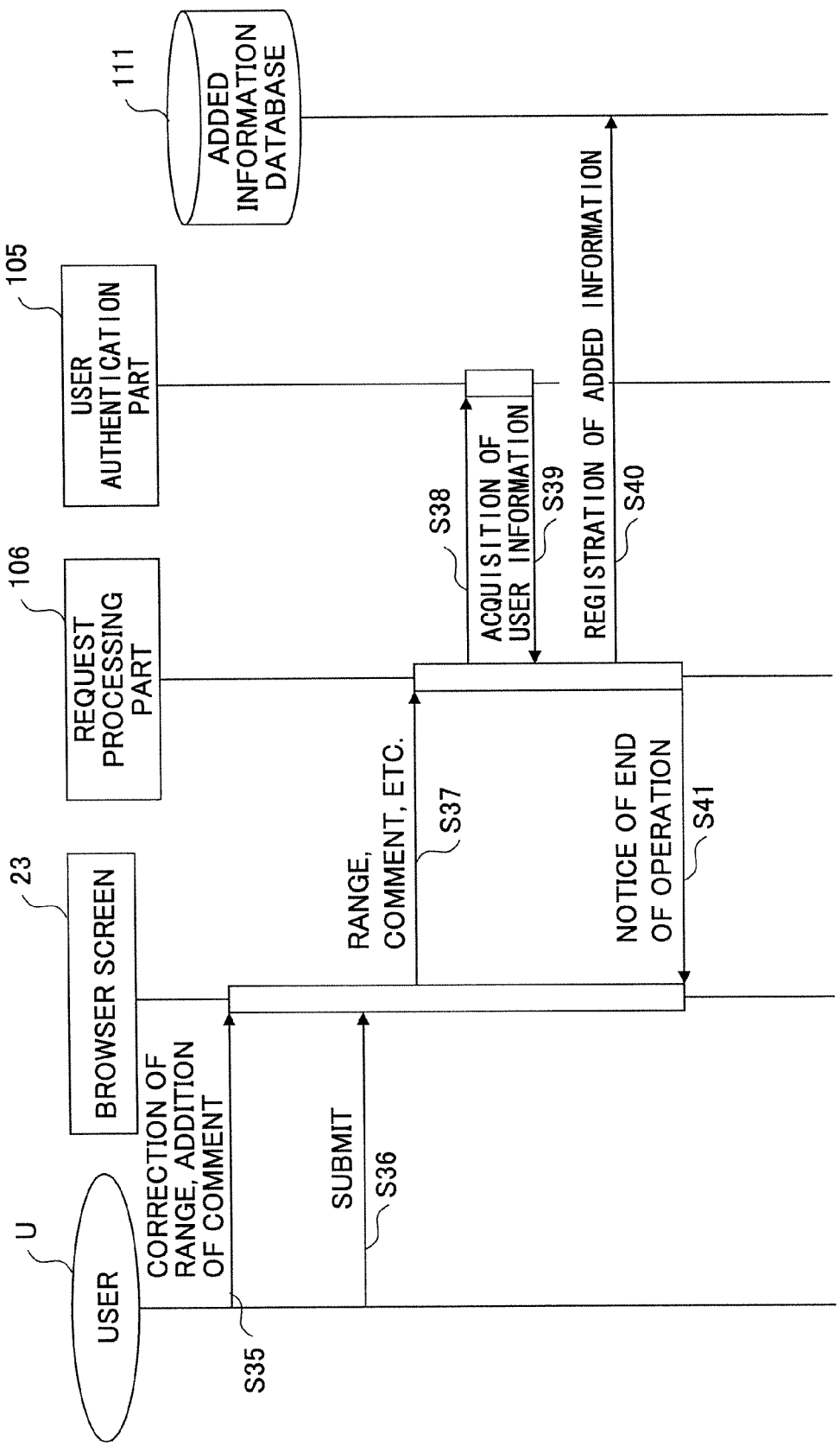

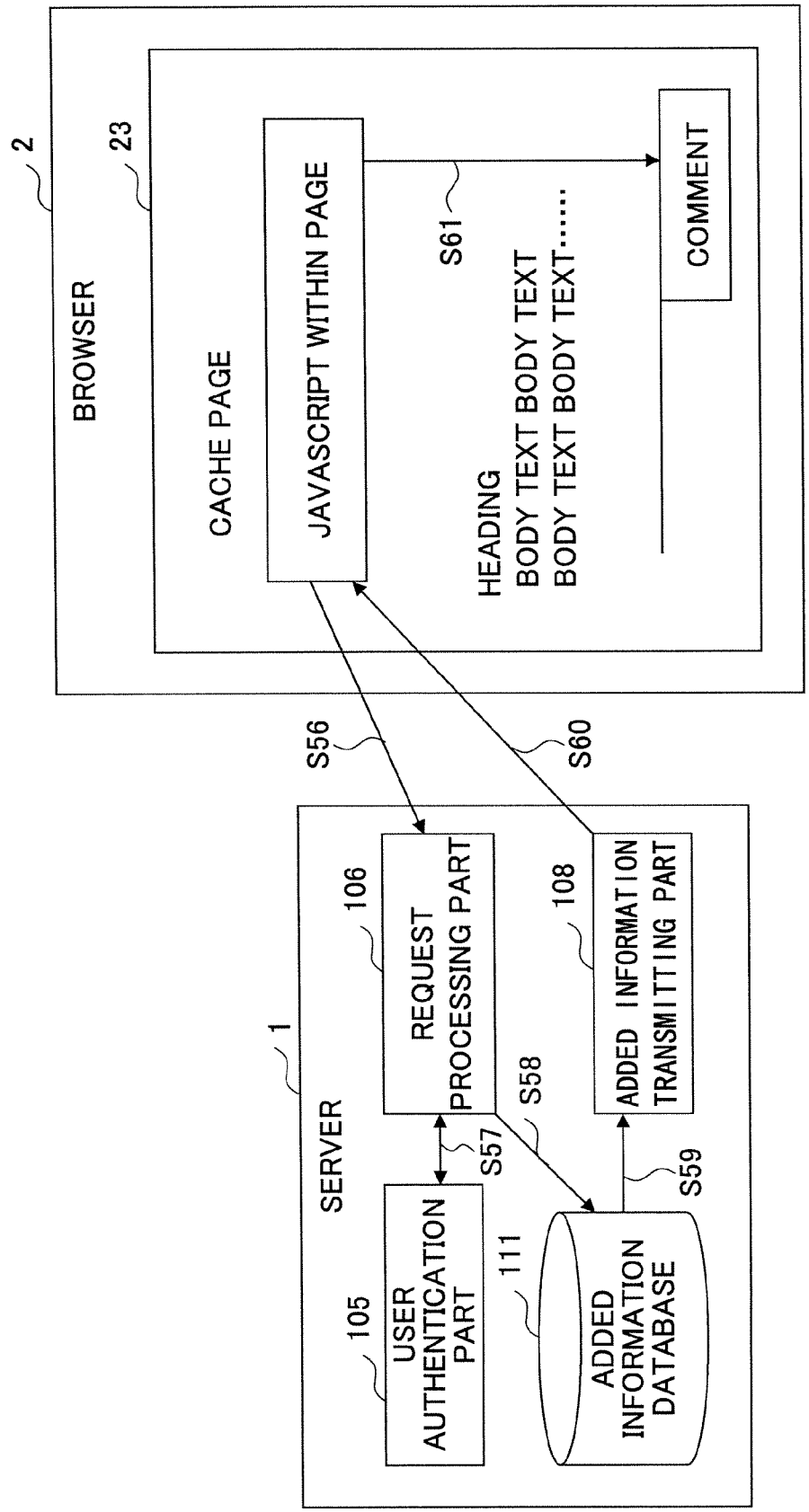

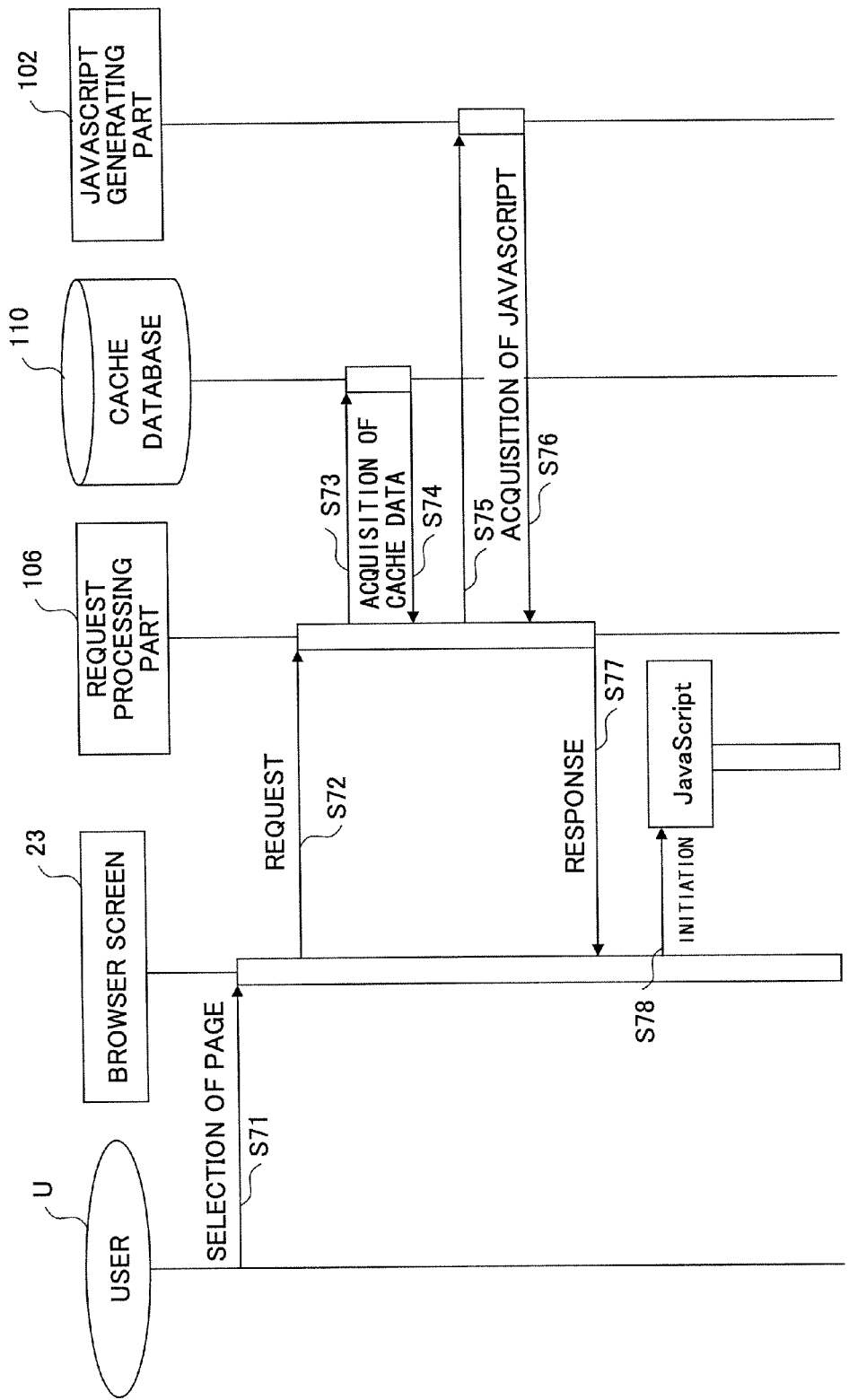

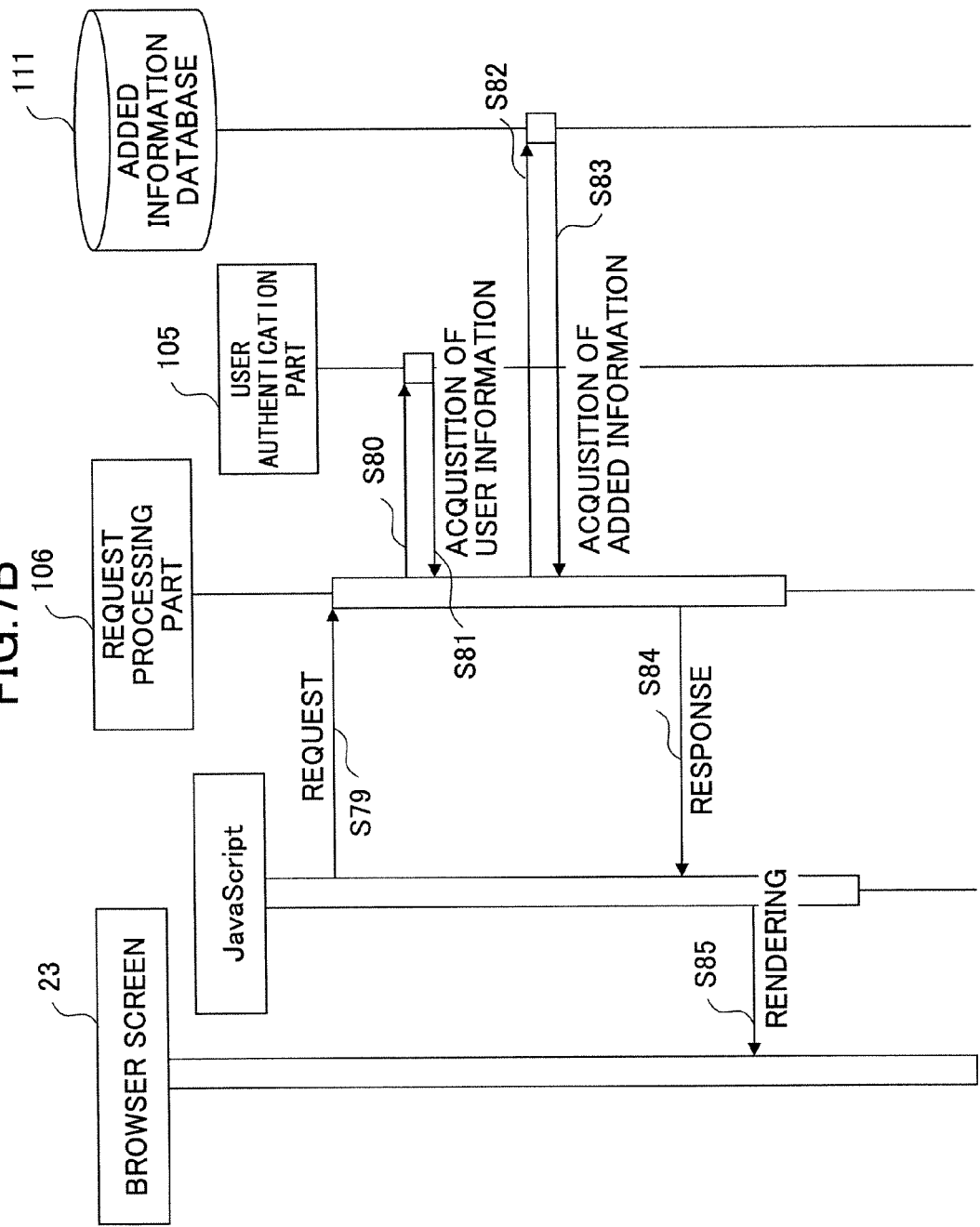

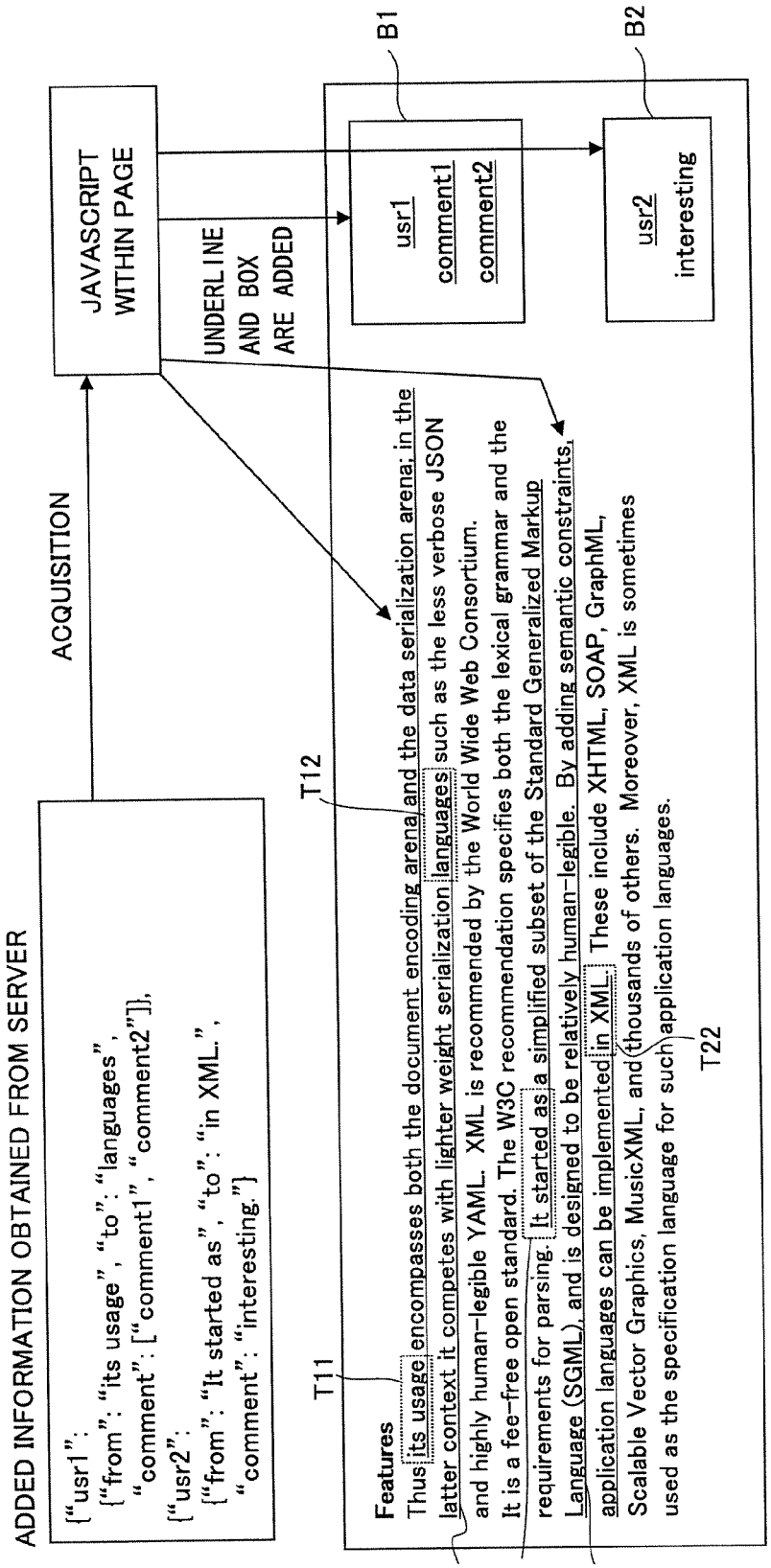

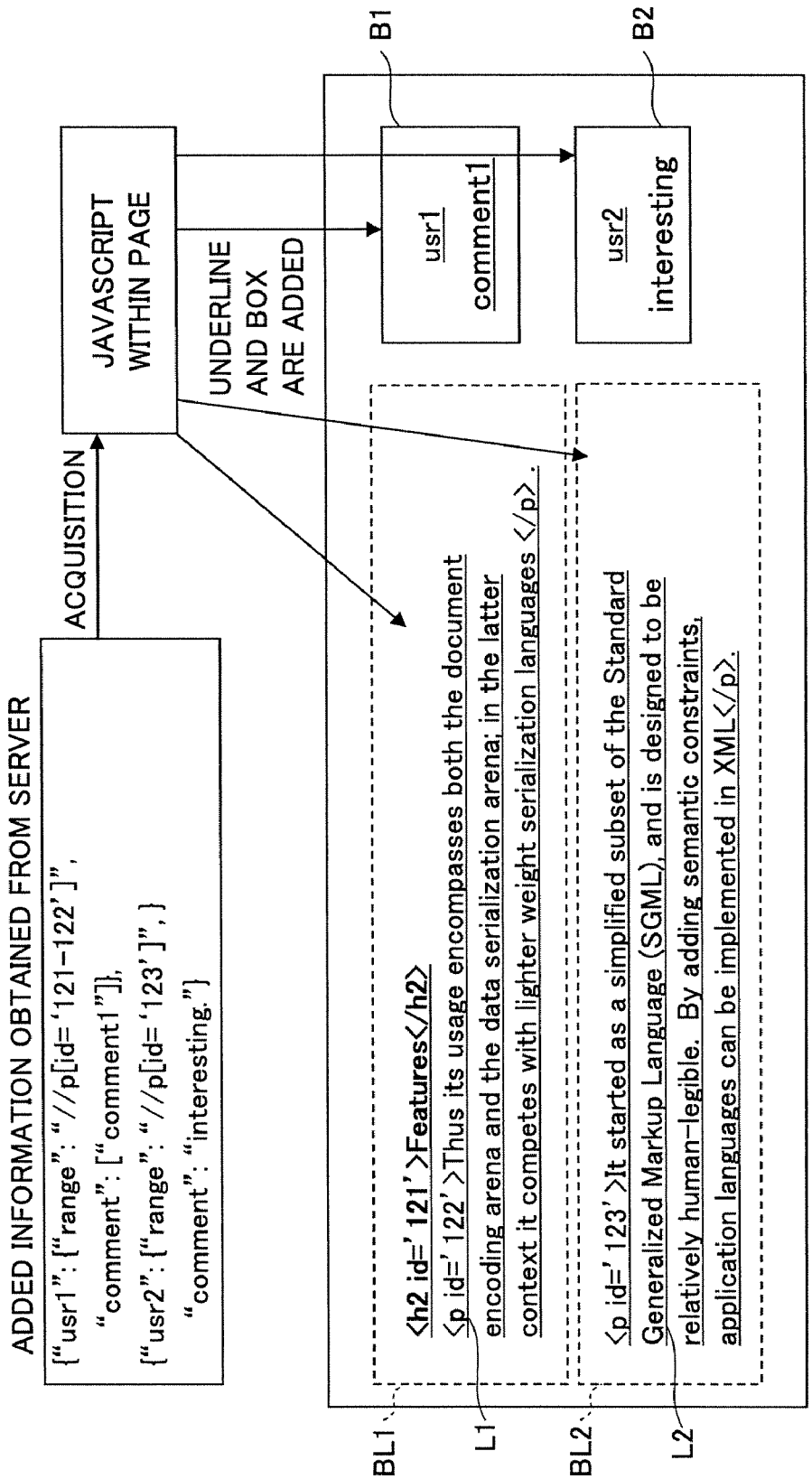

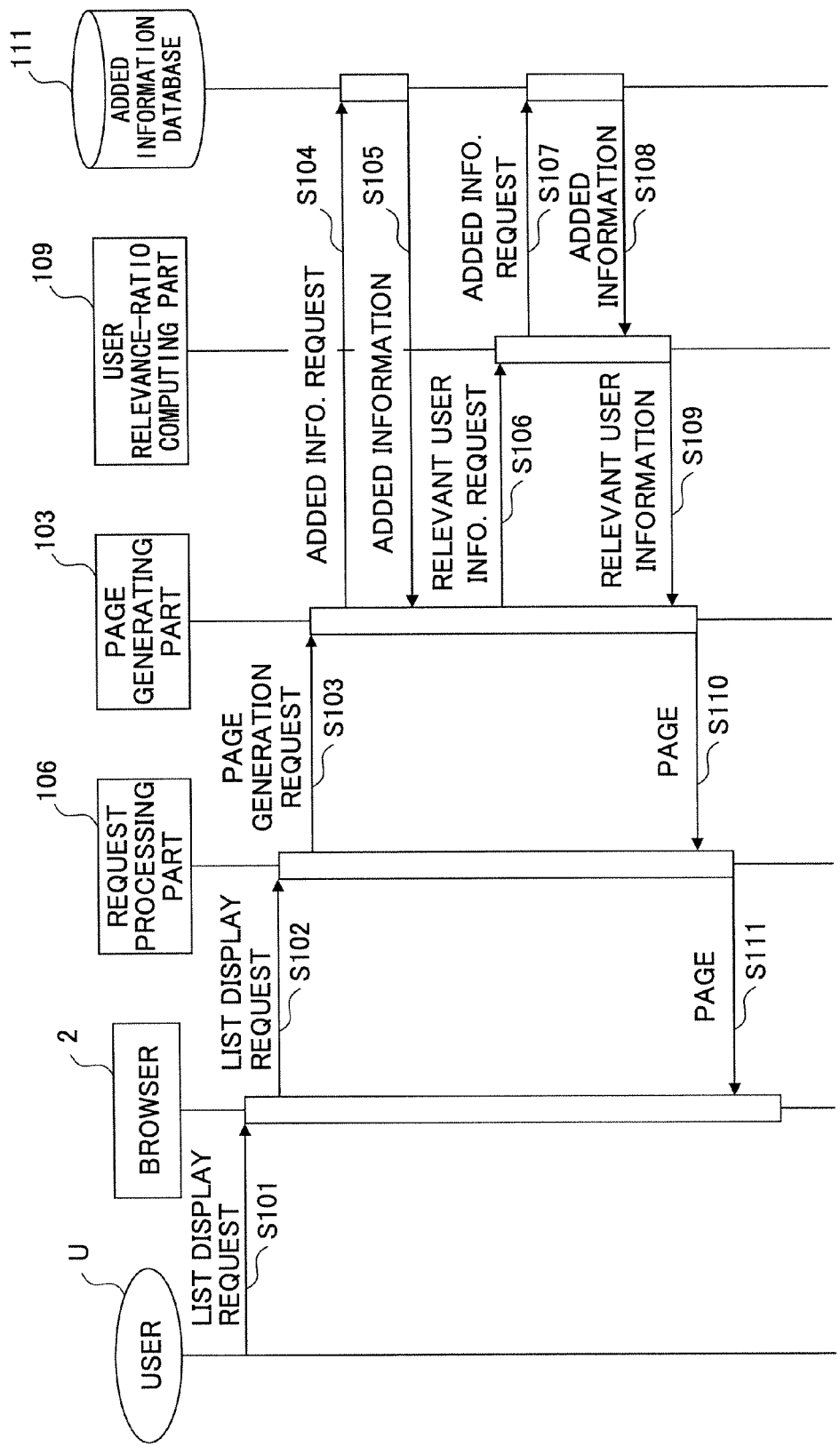

FIG.12A $$\text{RELEVANCE RATIO OF USER A AND USER B} = \frac{\text{(RANGE IN WHICH BOTH USER A AND USER B DREW UNDERLINE)}}{\text{(SUM OF RANGE IN WHICH USER A DREW UNDERLINE AND RANGE IN WHICH USER B DREW UNDERLINE)}}$$

| USER NAME | ARTICLE URI | ADDITION RANGE | COMMENT | REGISTRATION DATE/TIME |
|---|---|---|---|---|
| A | http://foo.com/123/456 | 1033-1086 | INTERESTING | 2007-08-01T1401 |
| B | http://foo.com/123/456 | 1772-1851 | ?? | 2007-08-02T0944 |
| C | http://example.jp/55555 | 353-398 | FOR REFERENCE | 2007-08-11T1522 |
| A | http://example.jp/55555 | 1100-1222 | | 2007-08-11T1538 |
| B | http://example.jp/55555 | 1150-1250 | | 2007-08-11T1547 |

FIG.12C

RELEVANCE RATIO OF USER A AND USER B = 0+(1222-1150)/((1086-1033)+(1222-1100)+(1851-1772)+(1250-1150))=20.3%

RELEVANCE RATIO OF USER A AND USER C = 0%

FIG.15
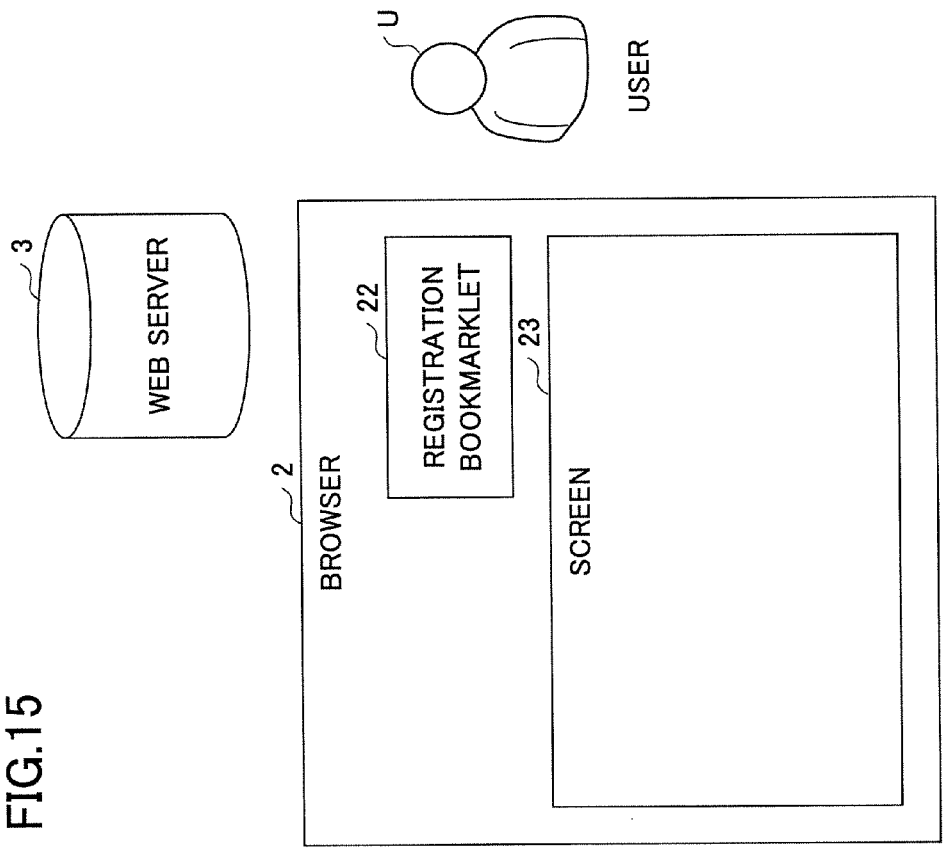
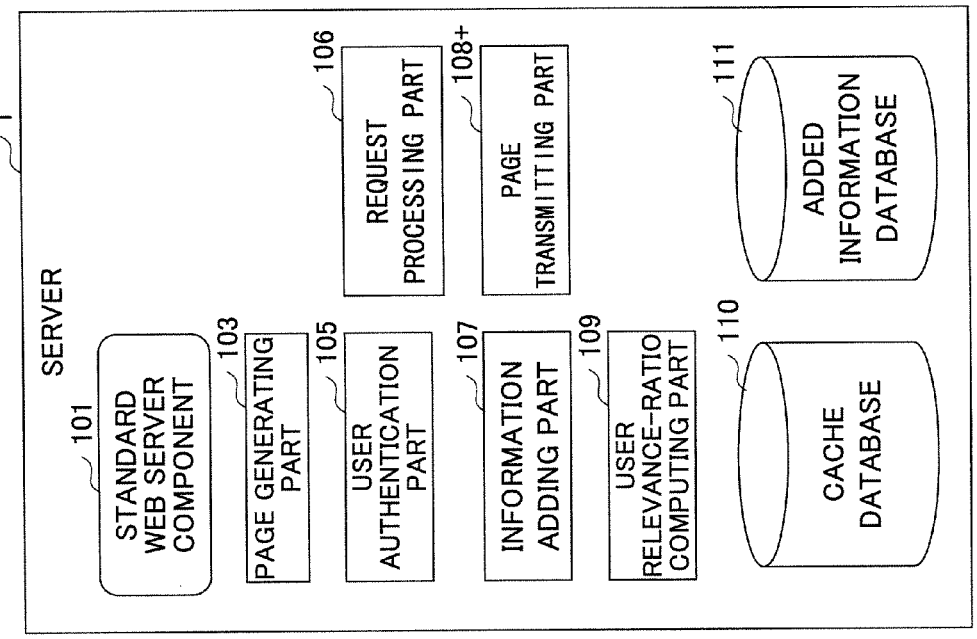

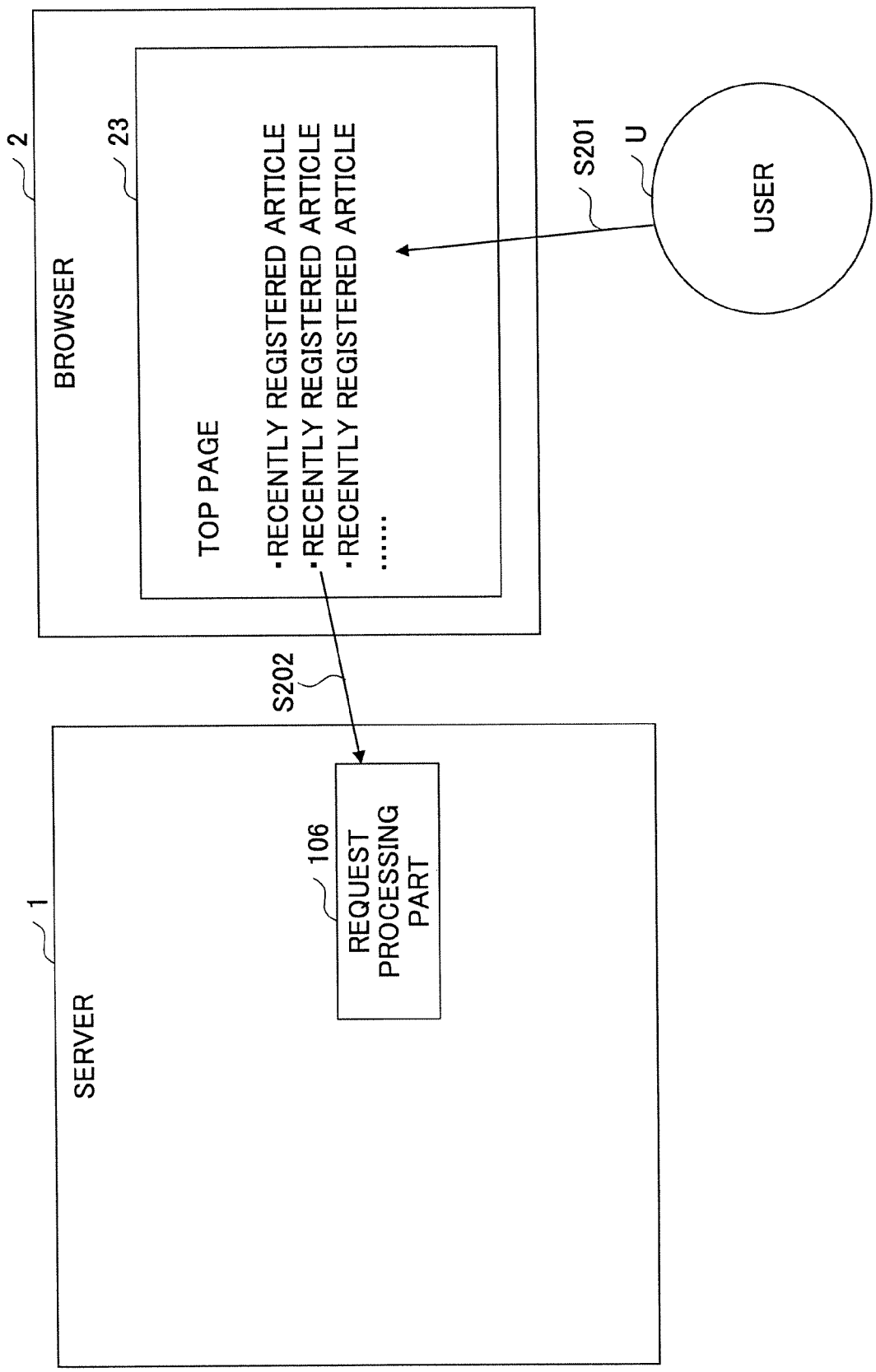

FIG.18

```
<html ...>
<head>
<meta "the system added the added information"/> ...    ⎫
</head>                                                  ⎬ D3
<body>                                                   ⎭
<p>(body text which is the same as that of the original page)</p> ~ D1
...
                                                         ⎫
<div id="ADDED INFORMATION">                             ⎪
<div id="UNDERLINE BY USER A" style="..."> ...</div>     ⎬ D2
<div id="COMMENT BY USER A">interesting.</div>           ⎪
...                                                      ⎪
</div>                                                   ⎭
</body>
</html>
```

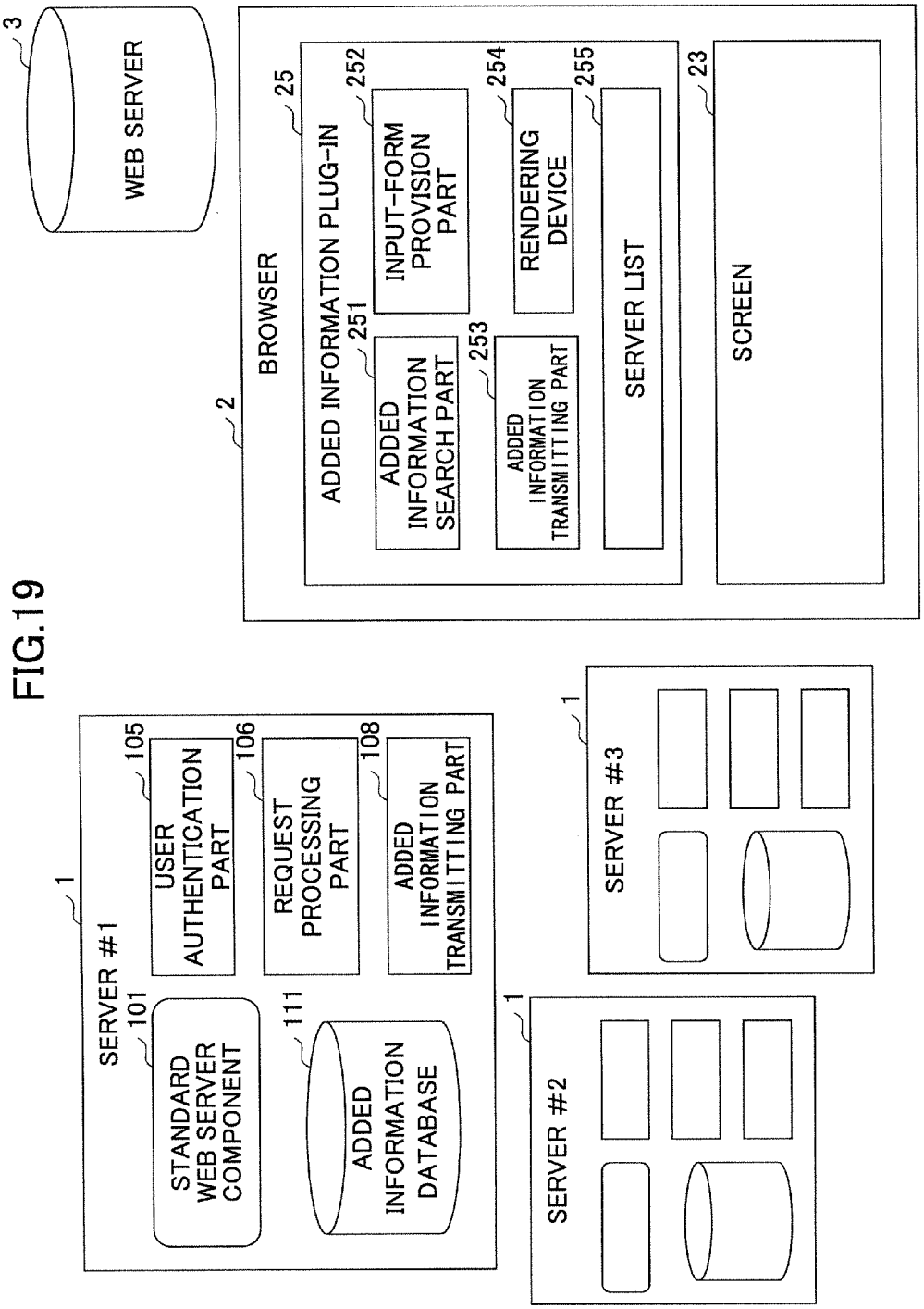

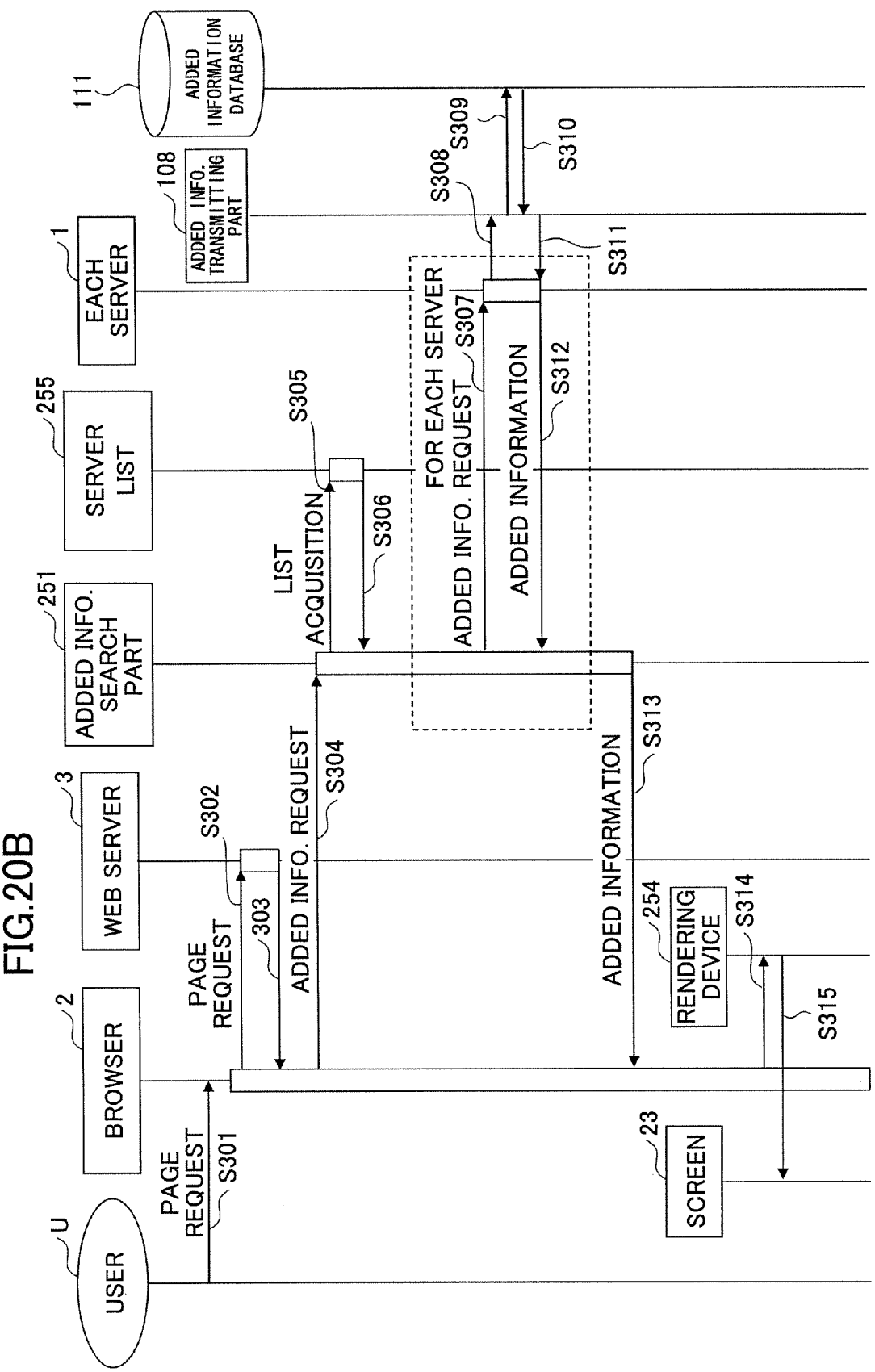

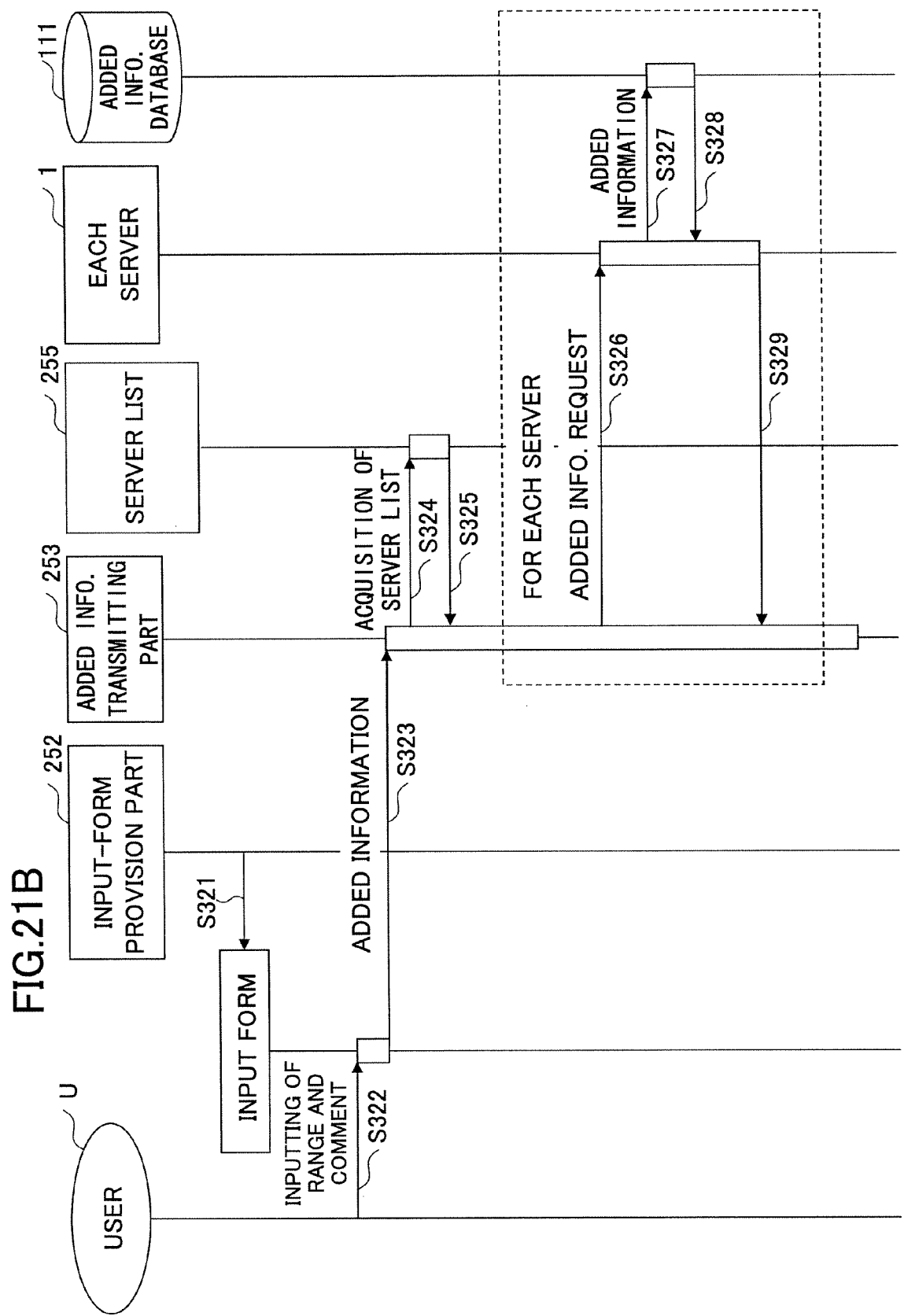

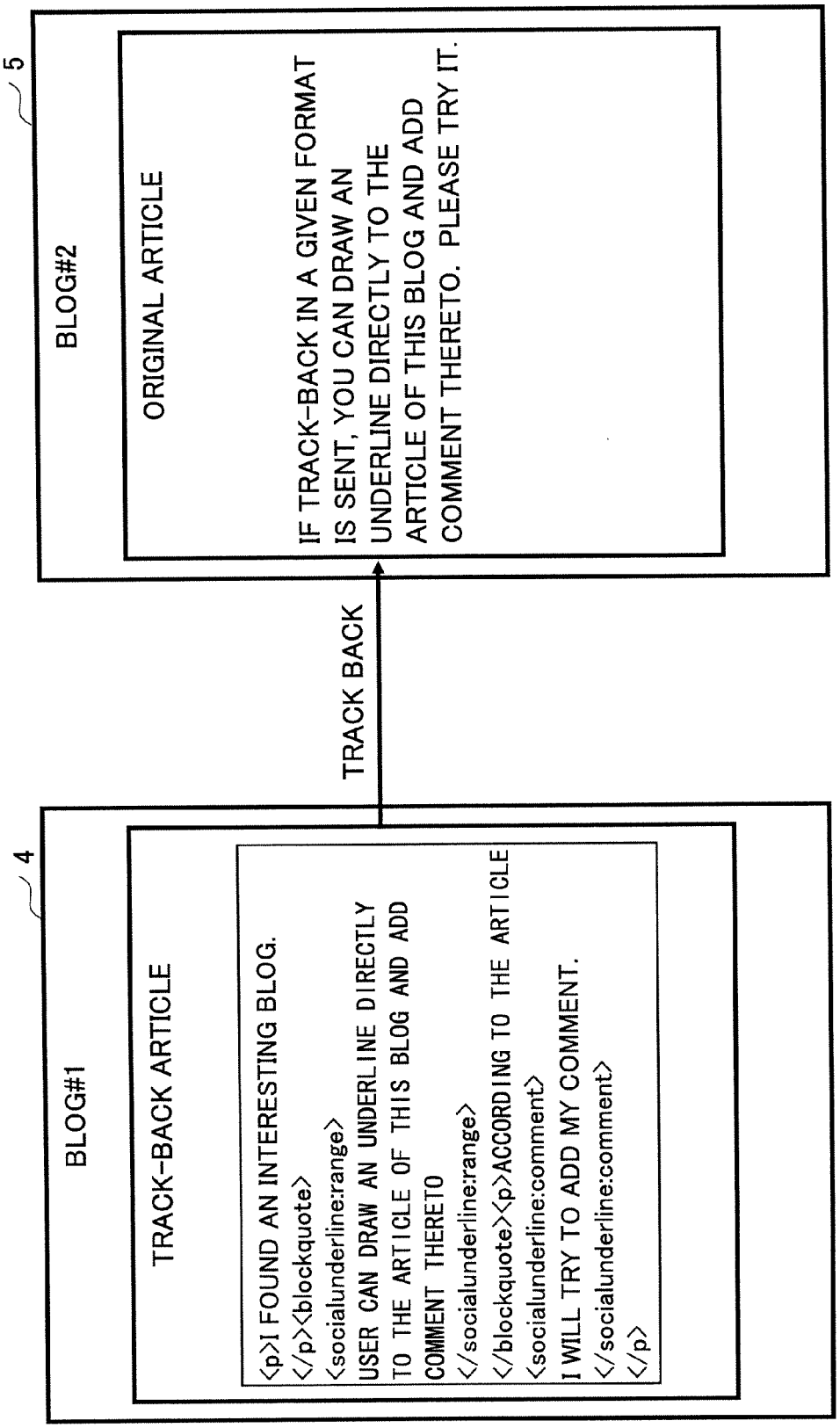

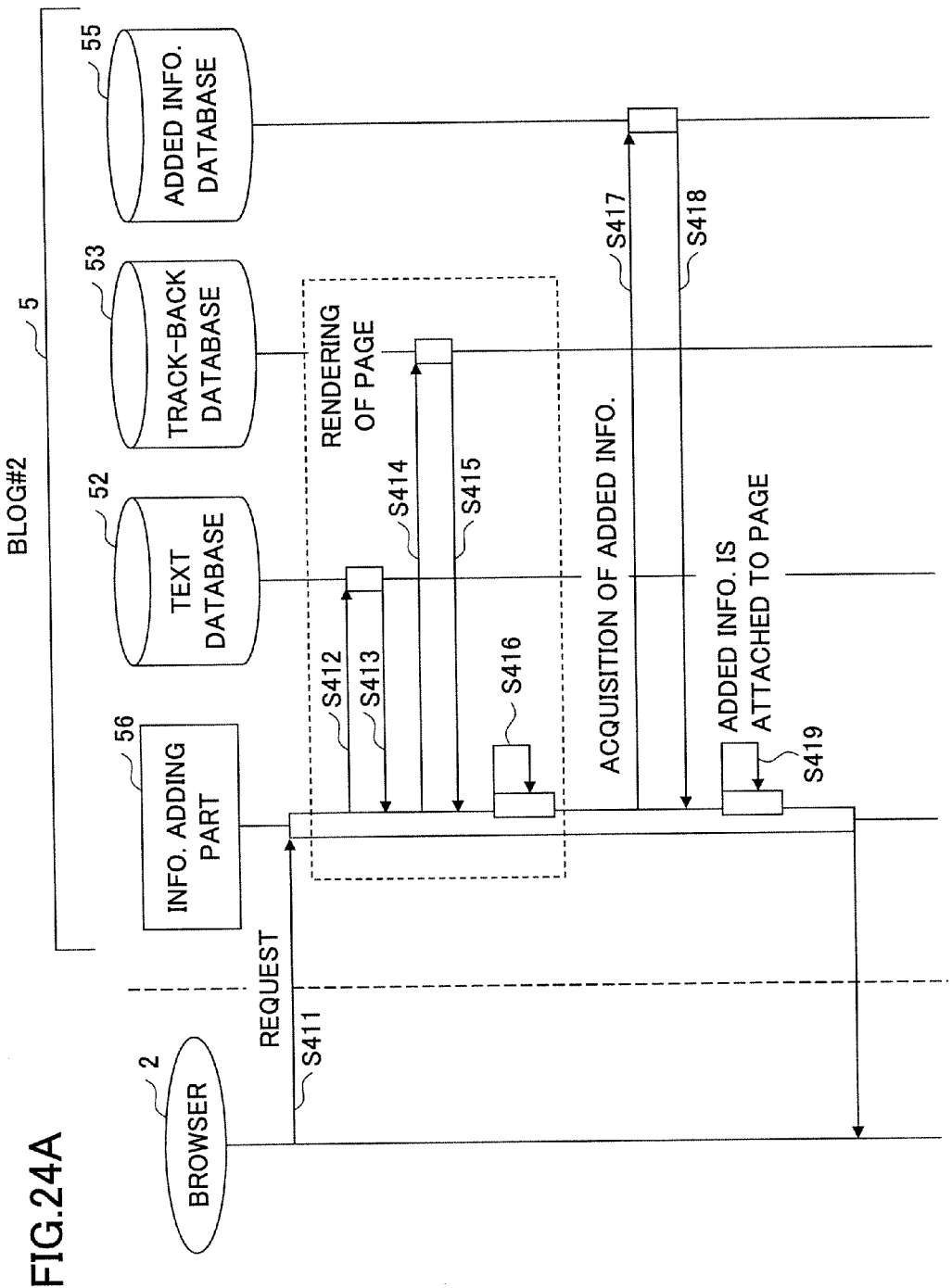

PAGE-ADDED INFORMATION SHARING MANAGEMENT METHOD

CROSS-REFERENCE TO RELATED APPLICATIONS

This patent specification is based on and claims priority from Japanese Patent Application Nos. 2006-278080 and 2007-245526, filed on Oct. 11, 2006 and Sep. 21, 2007, respectively, in the Japan Patent Office, the entire contents of which are incorporated by reference herein.

BACKGROUND OF THE INVENTION

1. Field of the Invention

This invention relates to page-added information sharing management method and device which perform operation of a Web page on the Internet.

2. Description of the Related Art

With the spread of the Internet, the opportunity to view various kinds of Web pages is increasing. Since massive amounts of information are provided by the Internet, it is becoming difficult for a user to choose information that is useful for himself from the information provided by the Internet.

Under such situations, the technology called social bookmark is proposed for sharing with other users an interesting Web page and its URL (Uniform Resource Locator) when a user find it. The user is able to register the URL of the Web page into the social bookmark with the same feeling as the bookmark normally used in the tool bar of a browser, etc. And the registered social bookmark can be accessed by any other computer which is connected to the network.

When the social bookmark mentioned above is used, the URL of a specific Web page is shared by a plurality of users, and the state of concern which the respective users have can be recognized, and this makes it possible to efficiently acquire useful information from the massive amounts of information.

However, the social bookmark is provided to merely specify a URL of a Web page. For this reason, if the amount of information contained in the Web page is massive or the contents of the Web page are complicated, it is difficult to detect which portion of the Web page is interested in by other users.

SUMMARY OF THE INVENTION

According to one aspect of the invention there is disclosed a page-added information sharing management method which enables one or a plurality of users to attach added information including underlines, markers and comments, to an object (such as a character string) of a Web page, and visualize the state of concern which the plurality of users have at the time of page viewing.

In an embodiment of the invention which solves or reduces one or more of the above-mentioned problems, there is disclosed a page-added information sharing management method which enables a plurality of users to attach added information, including underlining and comments to an object in an arbitrary page, and enables a plurality of users to share the added information, the page-added information sharing management method comprising steps of: receiving a setting of added information to an object in a page, including a range specification of the added information for the object; storing the added information by associating the added information with the page; and acquiring, when a request for displaying the added information is received, the added information associated with the page to be viewed, to provide a requesting device with the added information.

The above-mentioned page-added information sharing management method may be arranged to further comprise a step of providing a browser with a script which includes data of the page to be viewed and causes the browser to perform an acquisition request of the added information and a rendering of the acquired added information before the browser performs page viewing.

The above-mentioned page-added information sharing management method may be arranged to further comprise a step of combining the added information with the data of the page being viewed, to provide a requesting device with the page data with which the added information is combined.

The above-mentioned page-added information sharing management method may be arranged to further comprise steps of: storing a cache data of a page in which the added information is set; and providing the cache data of the page when a request for viewing the page is received.

The above-mentioned page-added information sharing management method may be arranged so that the step of acquiring the added information is arranged to acquire the added information from a track-back article received from an external device which performs track-back transmission, based on a predetermined tag.

The above-mentioned page-added information sharing management method may be arranged to further comprise a step of displaying a list of users having a relevance ratio larger than a given value, based on the stored added information.

The above-mentioned page-added information sharing management method may be arranged so that the object is a character string and the range specification is generated by specifying a starting-position character string to indicate a starting position of a range and an end-position character string to indicate an end position of the range.

The above-mentioned page-added information sharing management method may be arranged so that the object is a character string and the range specification is generated by specifying an element of a document described in a markup language.

In an embodiment of the invention which solves or reduces one or more of the above-mentioned problems, there is disclosed a page-added information sharing management device which enables a plurality of users to attach added information, including underlining and comments, to an object in an arbitrary page, and enables a plurality of users to share the added information, the page-added information sharing management device comprising: a receiving unit configured to receive a setting of added information to an object in a page, including a range specification of the added information for the object; a storing unit configured to store the added information by associating the added information with the page; and a providing unit configured to acquire, when a request for displaying the added information is received, the added information associated with the page to be viewed, to provide a requesting device with the added information.

According to the page-added information sharing management method of the invention, it is possible for one or a plurality of users to attach added information including underlines, markers and comments, to an object (such as a character string) of a Web page, and visualize the state of concern which the plurality of users have at the time of page viewing.

BRIEF DESCRIPTION OF THE DRAWINGS

Other objects, features and advantages of the invention will be apparent from the following detailed description when reading in conjunction with the accompanying drawings.

FIG. 2 is a block diagram showing the composition of a page-added information sharing management system in the first embodiment of the invention.

FIG. 5A and FIG. 5B are sequence diagrams for explaining the processing which is performed at the time of registering of added information.

FIG. 6A and FIG. 6B are diagrams showing the outline of operation of each part of the system at the time of page viewing.

FIG. 7A and FIG. 7B are sequence diagrams for explaining the processing which is performed at the time of page viewing.

FIG. 8 is a diagram showing an example of the rendering by a JavaScript in a browser.

FIG. 10 is a diagram showing an example of the rendering by a JavaScript in a browser.

FIG. 11A and FIG. 11B are diagrams showing the processing which is performed at the time of displaying a list of pages with added information, and an example of a displayed screen.

FIG. 12A, FIG. 12B and FIG. 12C are diagrams for explaining a method of computing a user relevance ratio.

FIG. 15 is a block diagram showing the composition of a page-added information sharing management system in the second embodiment of the invention.

FIG. 16A and FIG. 16B are diagrams showing the outline of operation of each part of the system at the time of page viewing.

FIG. 18 is a diagram showing an example of HTML data which is a page to which added information is attached.

FIG. 19 is a block diagram showing the composition of a page-added information sharing management system in the third embodiment of the invention.

FIG. 20A and FIG. 20B are diagrams for explaining the processing which is performed at the time of page access.

FIG. 21A and FIG. 21B are diagrams for explaining the processing which is performed at the time of added information inputting.

FIG. 23A and FIG. 23B are diagrams for explaining the processing which is performed at the time of track-back transmission.

FIG. 24A and FIG. 24B are diagrams showing the processing which is performed at the time of blog viewing, and an example of a displayed screen.

DETAILED DESCRIPTION OF PREFERRED EMBODIMENTS

A description will be given of embodiments of the invention with reference to the accompanying drawings.

Figure 1:
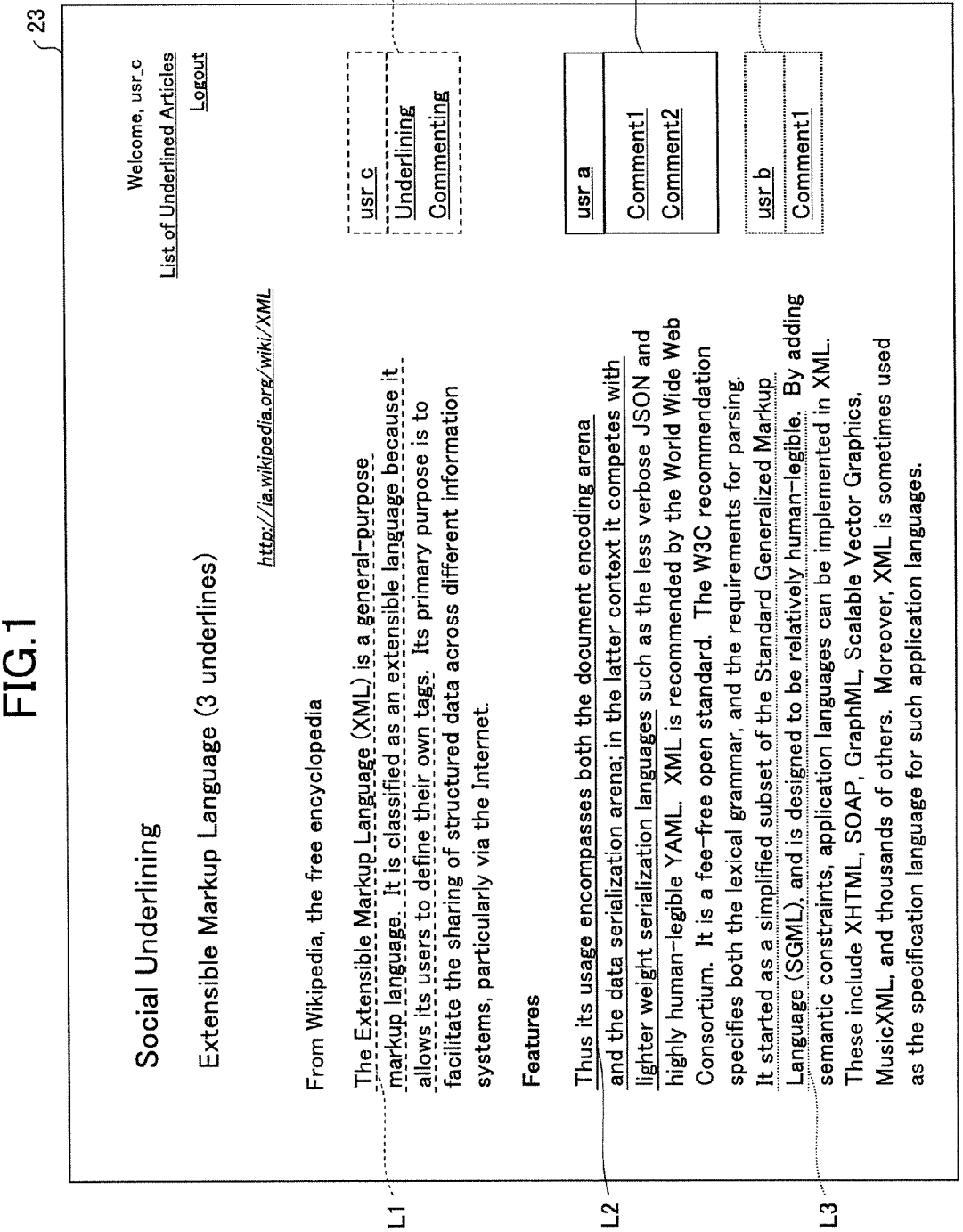
FIG. 1 is a diagram showing an example of a displayed screen in an embodiment of the invention.

FIG. 1 shows an example of a displayed screen 23 in an embodiment of the invention.

In the example of the screen 23 shown in FIG. 1, a user c (usr_c) is viewing a Web page by using a browser. In addition to the contents of the currently viewed page, an underline L1 drawn by the user c, an underline L2 drawn by another user a (usr_a), and an underline L3 drawn by another user b (usr_b) are displayed.

Moreover, in a corresponding position on the right-hand side of each of the underlines L1-L3, a box B1 which enables the current user c to perform operations of "drawing another underline", "writing a comment", etc., a box B2 which displays the comment corresponding to the underline L2 drawn by the other user a, and a box B3 which displays the comment corresponding to the underline L3 drawn by the other user b are displayed.

In the above-mentioned case, underlines are attached as enhancement representation of the added information to the page being viewed. Alternatively, markers, italics, boldfaces, etc. may be used instead.

Thus, according to the invention, it is possible for a plurality of users to attach the added information which includes enhancement representation, such as underlines, and annotation information, such as comments, to an arbitrary Web page. And it is possible for a plurality of users to share the added information to visualize the state of concern which the plurality of users have at the time of page viewing. The state of concern which the respective users have can be recognized, and this makes it possible to efficiently acquire useful information from the massive amounts of information.

A description will be given of the first embodiment of the invention. FIG. 2 shows the composition of a page-added information sharing management system in the first embodiment of the invention.

As shown in FIG. 2, the page-added information sharing management system includes a server 1 which manages added information, a browser 2 which is operated by a user U, and an external Web server 3 which is the target of page viewing. The server 1, the browser 2, and the Web server 3 are connected via the network, such as the Internet.

The server 1 includes a standard Web server component 101, a JavaScript generating part 102, and a page generating part 103. The JavaScript generating part 102 generates JavaScript which performs acquisition of added information and rendering (drawing) of the added information at the time of viewing of a Web page by the browser 2. The page generating part 103 generates a detailed page for registration at the time of registration of the added information by the user U, and generates a page for displaying a list of added information.

Moreover, the server 1 includes a user authentication part 105, a request processing part 106, an added information transmitting part 108, and a user relevance-ratio computing part 109. The user authentication part 105 manages the information of the users who use the functions of the server 1 and authenticates each user. The request processing part 106 processes the request from the browser 2. The added information transmitting part 108 transmits the added information to the browser 2. The user relevance-ratio computing part 109 computes a user relevance ratio and discovers other users who marked the portion of the page which is similar to that of the current user (those who are expected to have a similar concern).

Moreover, the server 1 includes a cache database 110 which holds the page data of the Web page which is the target of registration of the added information, and an added information database 111 which holds the added information.

The browser 2 includes a JavaScript engine 21, a registration bookmarklet 22, and a screen 23. The JavaScript engine 21 runs the JavaScript. The registration bookmarklet 22 provides a script described in the JavaScript which performs registration of the added information. And on the screen 23, a Web page is displayed.

Figure 3:
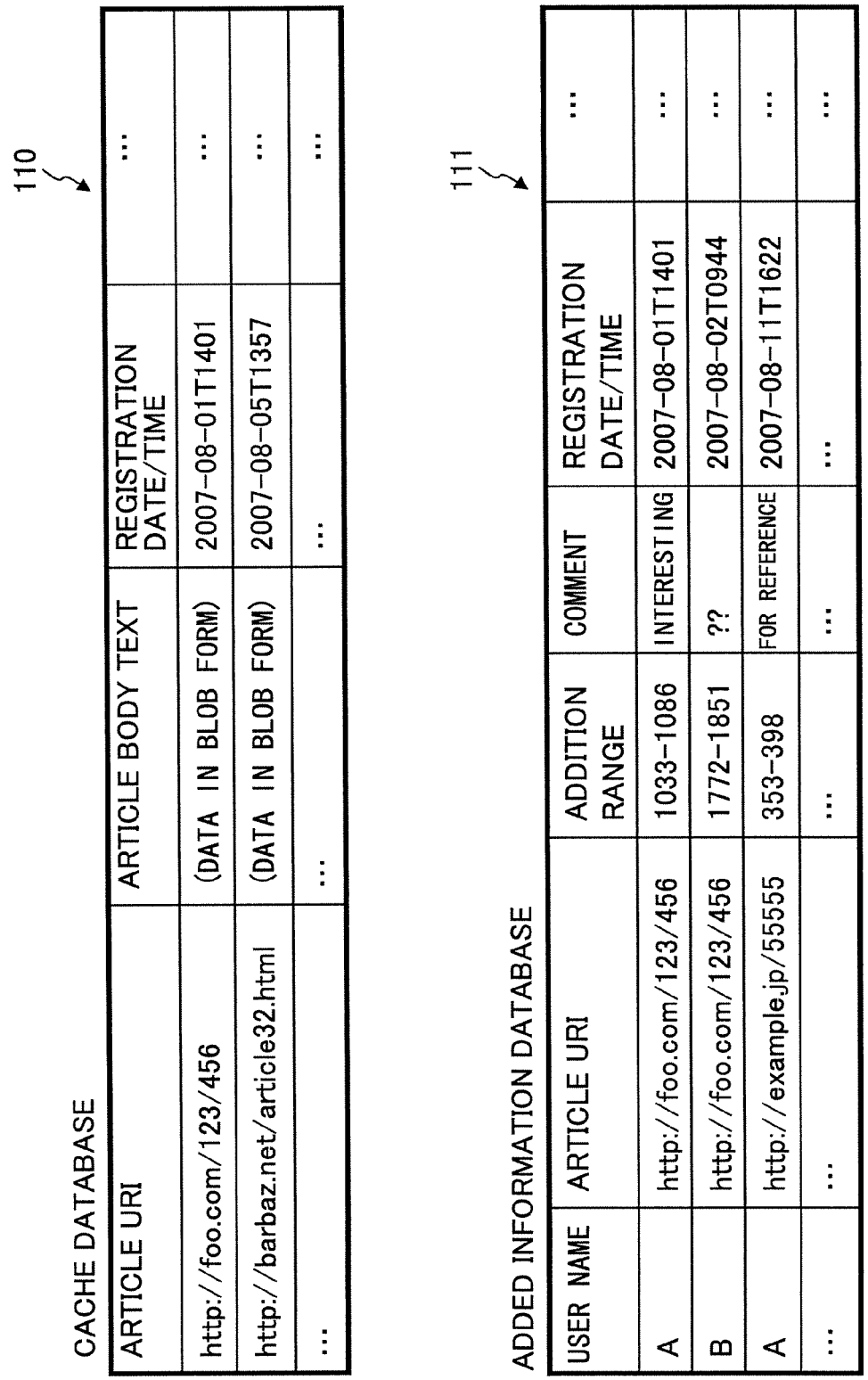
FIG. 3 is a diagram showing an example of databases.

FIG. 3 shows an example of the databases.

The cache database 110 contains the article URI indicating a URI (Uniform Resource Identifier) of a Web page which is stored as cache data, the body text including data in the form of BLOB (Binary Large Object), and the registration date/time indicating the date/time at which the cache data is stored.

The added information database 111 contains the user name indicating the user who registered the added information, the article URI indicating the URI of the Web page which is the object to which the added information is attached, the addition range indicating a range in which the added information is attached, the comment indicating the contents of the comment in the addition range, and the registration date/time indicating the date/time at which the added information is registered.

The data of the cache database 110 and the data of the added information database 111 are linked with each other by the article URI.

Figure 4A:
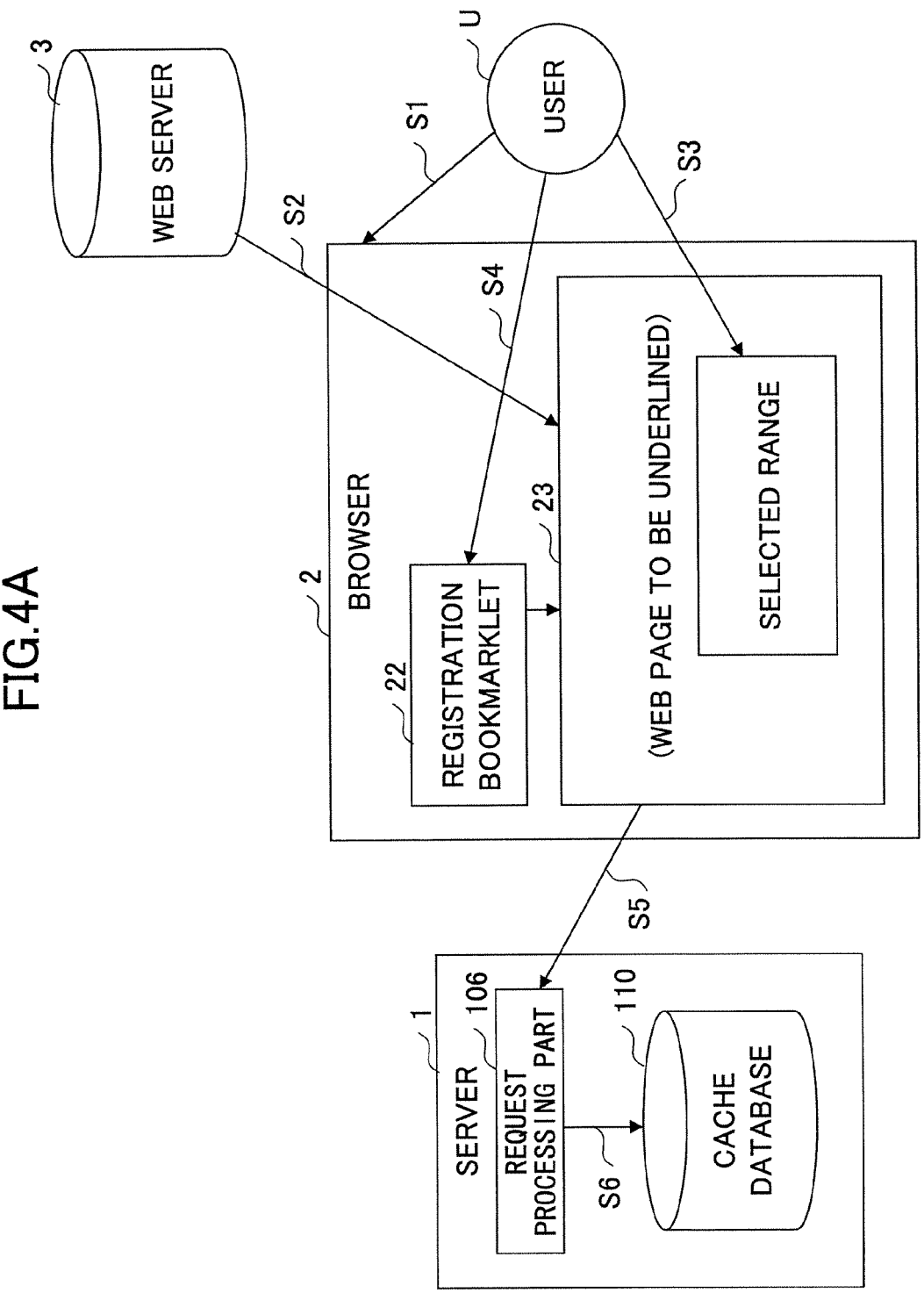
FIG. 4A and FIG. 4B are diagrams showing the outline of operation of each part of the system at the time of registering of added information.
Figure 4B:
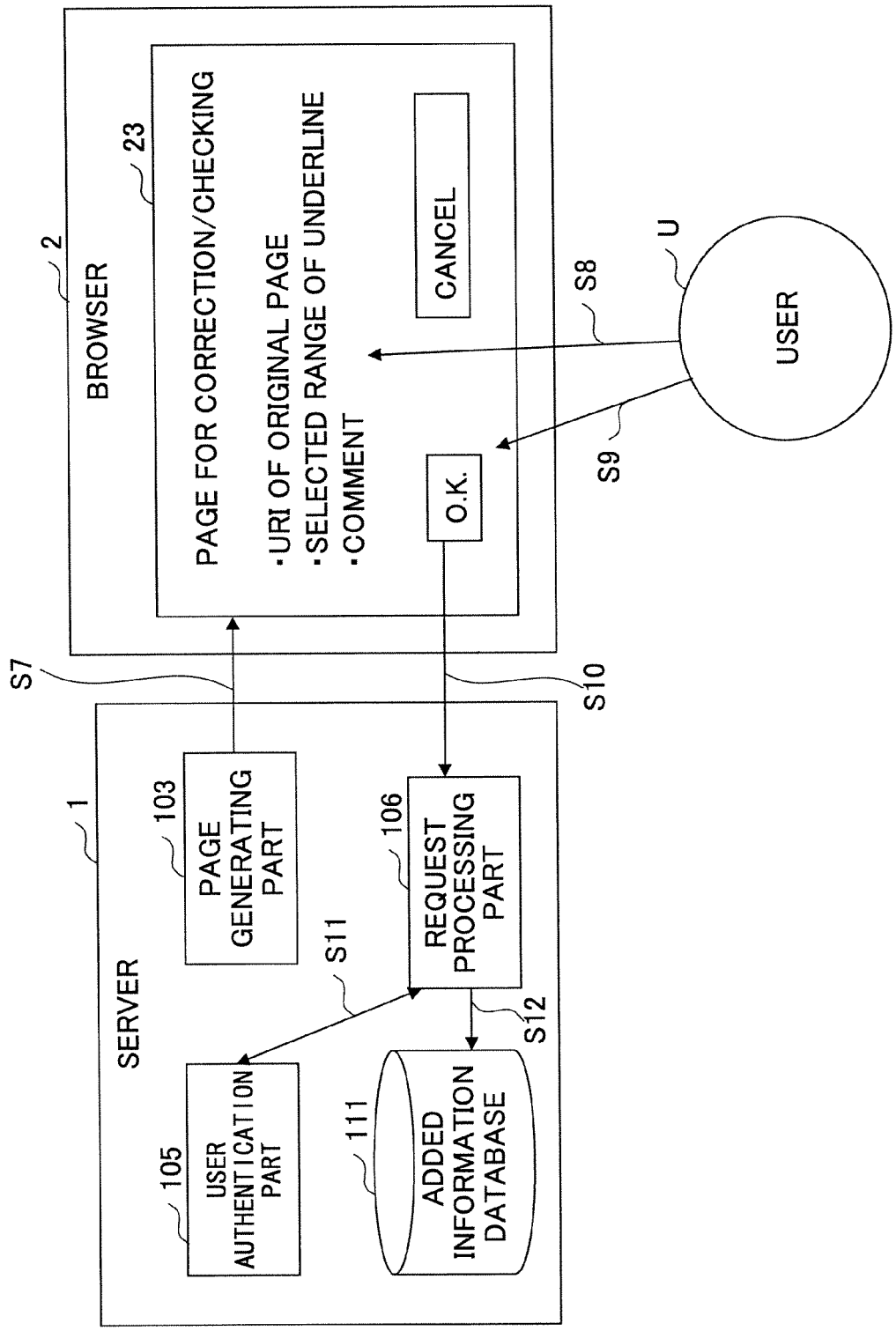

FIG. 4A and FIG. 4B show the outline of operation of each part of the system at the time of registration of added information.

As shown in FIG. 4A, when the user U calls a Web page to the browser 2 (step S1), the browser 2 acquires the corresponding Web page from the Web server 3 and displays the page on the screen 23 (step S2).

Subsequently, the user U selects the range of the Web page on the screen 23 in which an underline is drawn (step S3). When the registration bookmarklet 22 is initiated (step S4), the browser 2 transmits the data of the Web page which is the object in which an underline is drawn, to the server 1 (step S5), and the request processing part 106 of the server 1 stores the data of the Web page in the cache database 110 (step S6).

Subsequently, as shown in FIG. 4B, the page generating part 103 of the server 1 generates a page for correction/checking and transmits it to the browser 2 (step S7). The browser 2 displays the page for correction/checking on the screen 23.

On the other hand, the user U checks the range in which an underline is drawn, adds the comment if needed (step S8), and clicks the O.K. button (step S9). The browser 2 transmits the information including the selected range etc. to the server 1 (step S10). At this time, the browser 2 collectively transmits the information in the cookie indicating the user (the login user etc.) of the browser 2, to the server 1.

The request processing part 106 of the server 1 causes the user authentication part 105 to identify the user from the information in the cookie (step S11). When the user is an authorized user, the request processing part 106 stores the set of data {the user name, the article URI of the page, the addition range of the underline, the comment, and the registration date/time} into the added information database 111 (step S12).

FIG. 5A and FIG. 5B are sequence diagrams for explaining the processing which is performed at the time of registering of added information.

As shown in FIG. 5A, when the user U requests a page to the screen 23 of the browser 2 (step S21), the screen 23 transmits a page request to the Web server 3 (step S22). The page is displayed on the screen 23 based on the page data received from the Web server 3 (step S23).

Subsequently, the user U selects the range of the page in which an underline is drawn (step S24), and initiates the registration bookmarklet 22 (step S25). Then, the registration bookmarklet 22 acquires the display data for displaying the screen 23 (step S26, S27).

The registration bookmarklet 22 transmits the display data to the request processing part 106 of the server 1 as cache data (step S28). The request processing part 106 stores the received cache data into the cache database 110 (step S29).

Subsequently, the registration bookmarklet 22 performs a page call to the request processing part 106 (step S30). The request processing part 106 causes the page generating part 103 to generate the page for correction/checking in order to register the added information (steps S31 and S32).

The request processing part 106 transmits the page for correction/checking to the registration bookmarklet 22 (step S33). The registration bookmarklet 22 displays the page for correction/checking on the screen 23 (step S34).

Subsequently, as shown in FIG. 5B, the user U performs correction of the range in which the user U draws an underline or addition of comments etc. to the page for correction/checking on the screen 23 of the browser 2 (step S35).

When the user clicks the O.K. button (submission) (step S36), the screen 23 transmits the underline range, the comment, etc. to the request processing part 106 of the server 1 (step S37). At this time, the browser 2 collectively transmits the information in the cookie which indicates the user (login user etc.) of the browser 2.

Subsequently, the request processing part 106 acquires the user information from the user authentication part 105 based on the information in the cookie etc. (steps S38, S39). When the user is an authorized user, the added information is registered into the added information database 111 (step S40), and the completion of registration is notified to the screen 23 of the browser 2 (step S41).

Figure 6A:
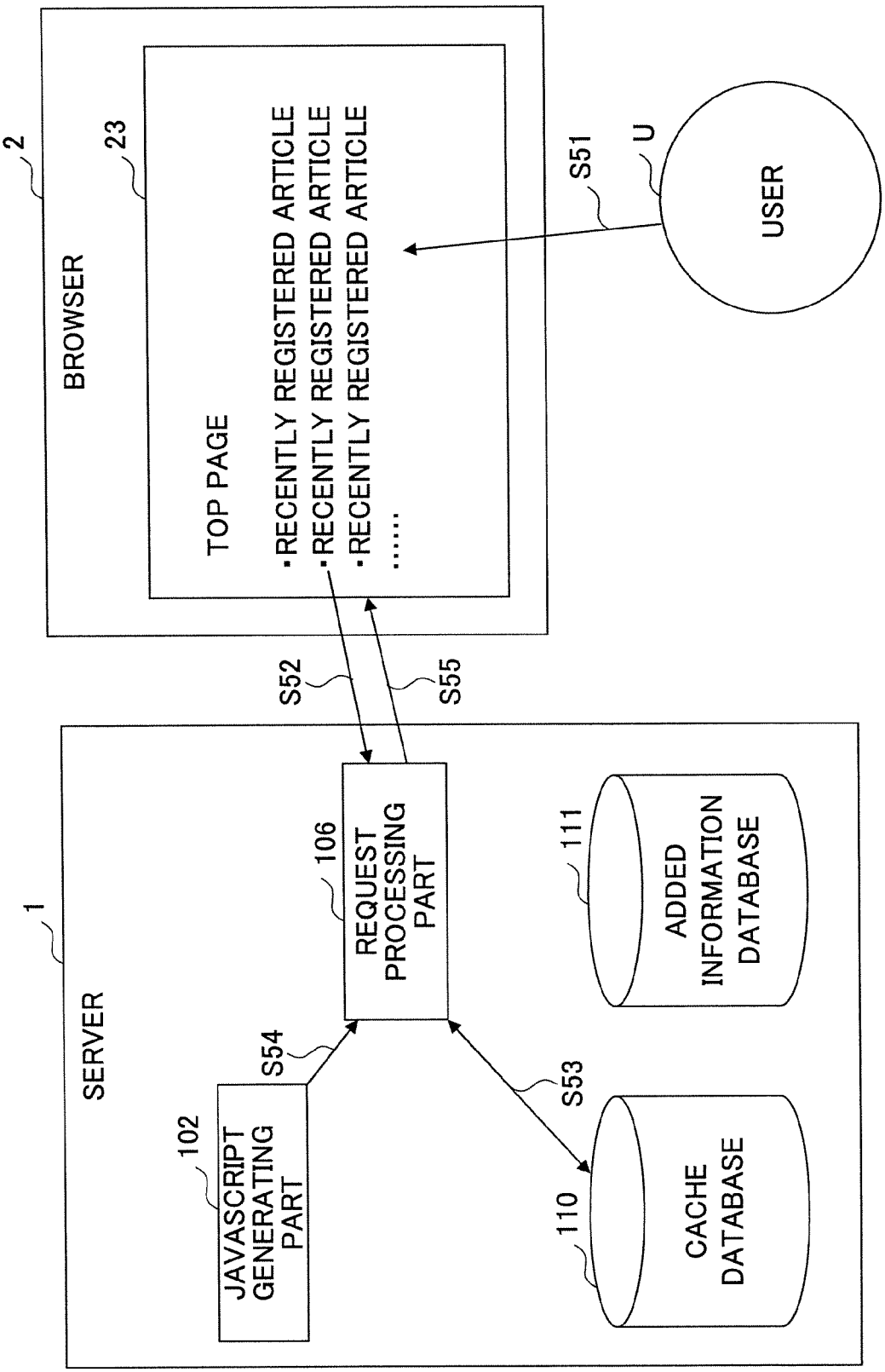

FIG. 6A and FIG. 6B are diagrams showing the outline of operation of each part of the system at the time of page viewing.

As shown in FIG. 6A, when the user U selects the page of a desired article from the top page displayed on the screen 23 of the browser 2 (step S51), the screen 23 transmits a page request to the request processing part 106 of the server 1 (step S52).

The request processing part 106 acquires the cache data of the corresponding page from the cache database 110 (step S53). And the request processing part 106 acquires the JavaScript from the JavaScript generating part 102 (step S54), and transmits the page data containing the JavaScript to the browser 2 as a response (step S55).

Subsequently, as shown in FIG. 6B, when execution of the JavaScript in the page is initiated by the JavaScript engine 21 (FIG. 2) in the browser 2, the JavaScript specifies the page and transmits a page request to the request processing part 106 of the server 1 (step S56). At this time, the browser 2 collectively transmits the information in the cookie which indicates the user (login user etc.) of the browser 2.

The request processing part 106 causes the user authentication part 105 to specify the user from the information in the cookie. (step S57).

Subsequently, when the user is an authorized user, the request processing part 106 acquires the added information (including the comments) relevant to the cache page from the added information database 111, and transmits it to the added information transmitting part 108 (steps S58, S59).

The added information transmitting part 108 transmits the added information to the browser 2 (step S60), and the JavaScript in the page performs the rendering of the added information (step S61).

FIG. 7A and FIG. 7B are sequence diagrams for explaining the processing which is performed at the time of page viewing.

As shown in FIG. 7A, when the user U performs page selection to the screen 23 of the browser 2 (step S71), the screen 23 transmits a page request to the request processing part 106 of the server 1 by specifying the page to be viewed (step S72).

The request processing part 106 acquires the cache data of the corresponding page corresponds from the cache database 110 (steps S73, S74).

Subsequently, the request processing part 106 acquires the JavaScript from the JavaScript generating part 102 (steps S75, S76). And the request processing part 106 transmits a response to the screen 23 of the browser 2 (step S77), so that the screen 23 initiates the JavaScript contained in the page of the received response (step S78).

Subsequently, as shown in FIG. 7B, the JavaScript contained in the page transmits a request to the request processing part 106 of the server 1 by specifying the page (step S79).

The request processing part 106 acquires the user information by using the user authentication part 105 (steps S80, S81). And the request processing part 106 acquires the added information relevant to the page from the added information database 111 (steps S82, S83).

Subsequently, the request processing part 106 transmits the acquired added information to the JavaScript within the page of the browser 2 as a response (step S84), so that the JavaScript in the page performs the rendering of the added information to the screen 23 (step S85).

FIG. 8 shows an example of the rendering by the JavaScript in the browser 2. In the example of FIG. 8, the rendering of an underline L1, which extends from a character string T11 on the page corresponding to the starting-position character string ("from"): "its usage" of the added information "usr1", obtained from the server 1, to a character string T12 on the page corresponding to the end-position character string ("to"): "languages" of the added information "usr1", is performed. Moreover, the rendering of an underline L2, which extends from a character string T21 on the page corresponding to the starting position character string ("from"): "It started as" of the added information "usr2" to a character string T22 on the page corresponding to the end-position character string ("to"): "in XML" of the added information "usr2", is performed.

Moreover, in the example of FIG. 8, the rendering of a box B1 which indicates the "comment1" and "comment2" of the user "usr1" is performed to a corresponding position on the right-hand side of the underline L1, and the rendering of a box B2 which indicates the comment "interesting" of the user "usr2" is performed to a corresponding position on the right-hand side of the underline L2.

Figure 9:
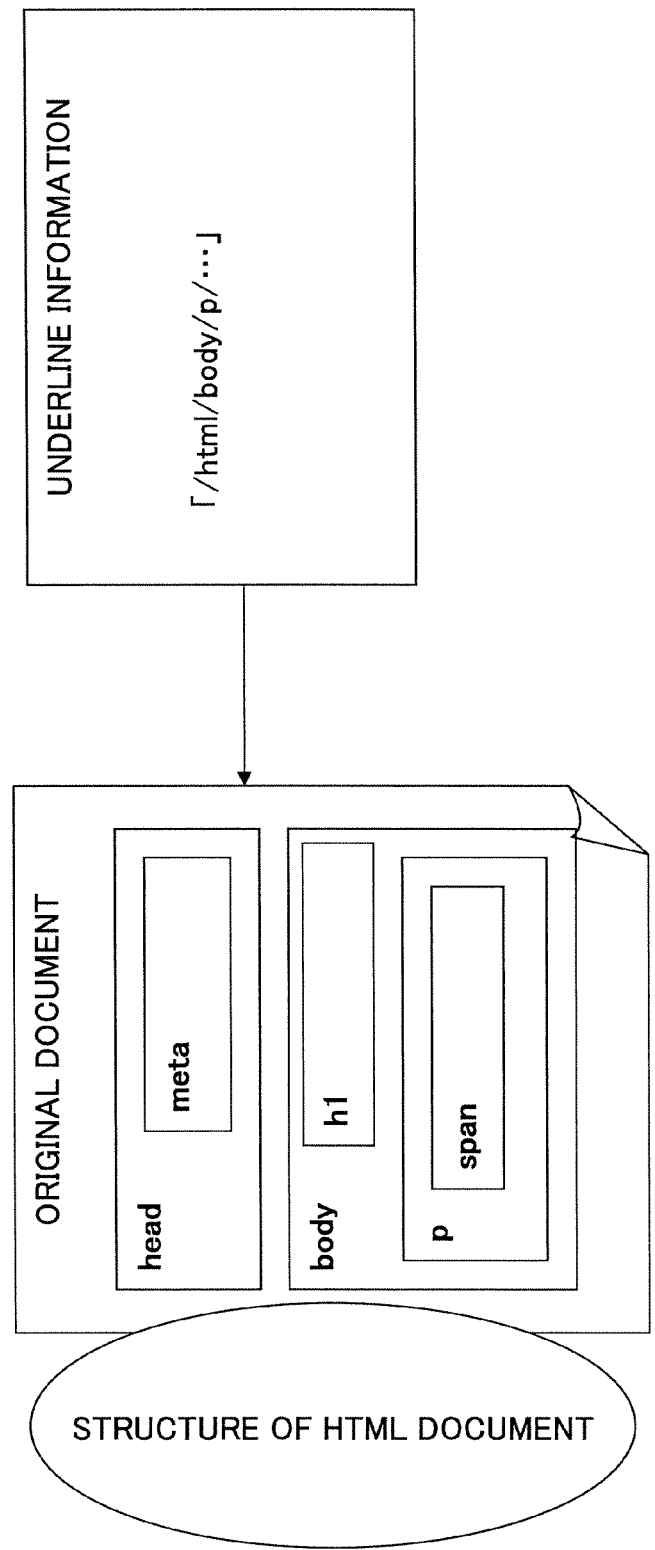
FIG. 9 is a diagram showing an example of range specification.

FIG. 9 shows another example of the range specification. The example of the range specification shown in FIG. 9 employs the data structure of the target page.

In the example of FIG. 9, suppose that the original document described in HTML (Hyper Text Markup Language) contains the elements called "head" and "body", and the element "body" further contains the element "p". When the user intends to perform the range specification for the block following the element "p", the underlining information in such a case can be described in the form of "/html/body/p/ . . . " in conformity with the Xpath (which is the standard specifications which define the describing method for indicating a specific element in an XML document). When an "id" attribute is given to the element "p", the underlining information may be described in the form of "//p id="xxx"" by using the abbreviation notation of the Xpath.

FIG. 10 shows an example of the rendering by the JavaScript in the browser 2 in the case of the range specification mentioned above. In the example of FIG. 10, the rendering of an underline L1, which is attached to a block BL1 on the page corresponding to the range ("range"): "//p id='121-122'" of the user "usr1" of the underlining information, acquired from the server 1, is performed. Moreover, the rendering of an underline L2, which is attached to a block BL2 on the page corresponding to the range ("range"): "//p id='123'" of the user "usr2" of the underlining information, is performed.

Moreover, in the example of FIG. 10, the rendering of a box B1 which indicates the comment "comment 1" of the user "usr1" is performed to a corresponding position on the right-hand side of the underline L1, and the rendering of a box B2 which indicates the comment "interesting" of the user "usr2" is performed to a corresponding position on the right-hand side of the underline L2.

Figure 11B:
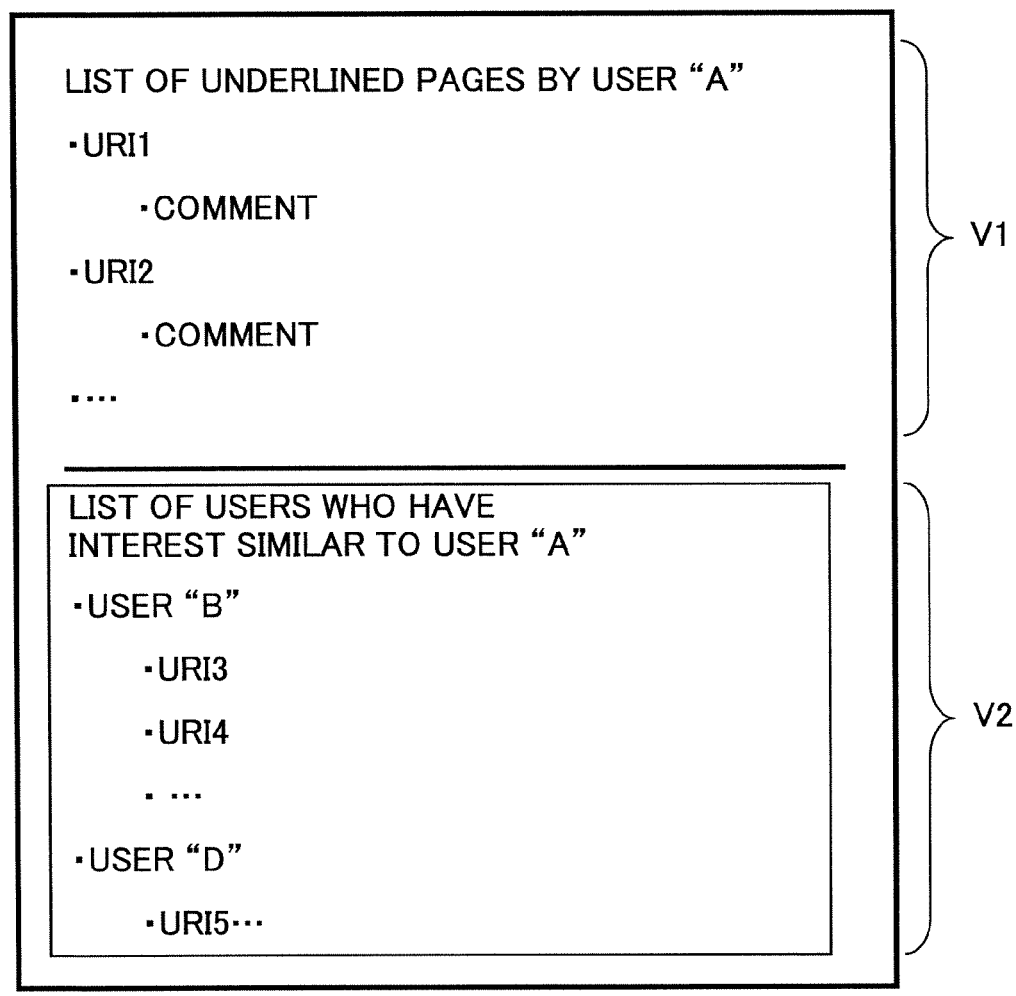

FIG. 11A and FIG. 11B show the processing which is performed at the time of displaying a list of pages with added information, and an example of a displayed screen.

As shown in FIG. 11A, when the user U requests a list displaying by clicking a predetermined button in the browser 2 (step S101), the browser 2 transmits a list displaying request to the request processing part 106 of the server 1 (step S102). The request processing part 106 transmits a page generation request for the list displaying to the page generating part 103 (step S103).

In response, the page generating part 103 acquires the added information, which is registered by the user U concerned, from the added information database 111 (steps S104, S105). And the page generating part 103 transmits a request of relevant user information to the user relevance-ratio computing part 109 (step S106).

The user relevance-ratio computing part 109 acquires, from the added information database 111, the other users' added information which is registered by other users with respect to the same page as that of the user U concerned (steps S107, S108).

The user relevance-ratio computing part 109 determines other users who have concern that is very similar to that of the user U concerned as being the relevant users, based on the computed user relevance ratios, and transmits the relevant user information to the page generating part 103 as a response (step S109). The method of computing a user relevance ratio will be mentioned later.

And the page generating part 103 generates a list page which contains a list of pages to which the added information is attached by the user U concerned, and a list page which contains a list of pages to which the added information is attached by the relevant users regarding the user U concerned, and transmits these list pages to the request processing part 106 (step S110).

The request processing part 106 transmits the list pages to the browser 2 (step S111) so that the browser 2 displays them on the screen 23.

FIG. 11B shows an example of a displayed screen. As shown in FIG. 11B, when the user A requests a list displaying, a page list V1 which is a list of pages to which underlines are drawn by the user A, and a page list V2 which is a list of pages to which underlines are drawn by the relevant users who have interest similar to that of the user A are displayed. In the page list V1, a plurality of URIs are displayed together with the corresponding comments. And in the page list V2, a plurality of user names are displayed together with a set of URIs of the unread articles (unread articles for the user A).

FIG. 12A, FIG. 12B and FIG. 12C show the method of computing the user relevance ratio which is performed by the user relevance-ratio computing part 109.

As shown in FIG. 12A, a relevance ratio of the user A and the user B with respect to the pages to which the added information was attached by both the user A and the user B is defined as being a ratio of the range (the number of characters) in which both the user A and the user B drew underlines to a sum of the range (the number of characters) in which the user A drew underlines and the range (the number of characters) in which the user B drew underlines.

The user relevance-ratio computing part 109 in the composition of FIG. 2 is arranged to perform the above-mentioned computation between the current user and other users by making reference to the cache database 110 and the added information database 111. Based on the results of the computation, the user relevance-ratio computing part 109 can discover the relevant users (those who are expected to have concern similar to that of the current user) who have attached marking to the article portions which are similar to those of the current user, and can provide the current user with a list of relevant users with a high relevance ratio.

The example of FIG. 12C shows a result of the calculation of the relevance ratio of the user A and the user B when the added information database 111 is in the state shown in FIG. 12B. In this example, both the user A and the user B registered the added information to the article URI "http://foo.com/123/456" and the article URI "http://example.jp/55555". The range in which both the user A and the user B drew underlines to the article URI "http://foo.com/123/456" does not exist. The range in which both the user A and the user B drew underlines to the article URI "http://example.jp/55555" is 1150-1222. The range in which the user A drew underlines to the article URI "http://foo.com/123/456" is 1033-1086. The range in which the user A drew underlines to the article URI "http://example.jp/55555" is 1100-1222. The range in which the user B drew underlines to the article URI "http://foo.com/123/456" is 1772-1851. The range in which the user B drew underlines to the article URI "http://example.jp/55555" is 1150-1250. Accordingly, the computed relevance ratio of the user A and the user B is equal to 20.3%. Since the user A and the user C have not registered the added information to the same page, the computed relevance ratio of the user A and the user C is equal to 0%.

Figure 13:
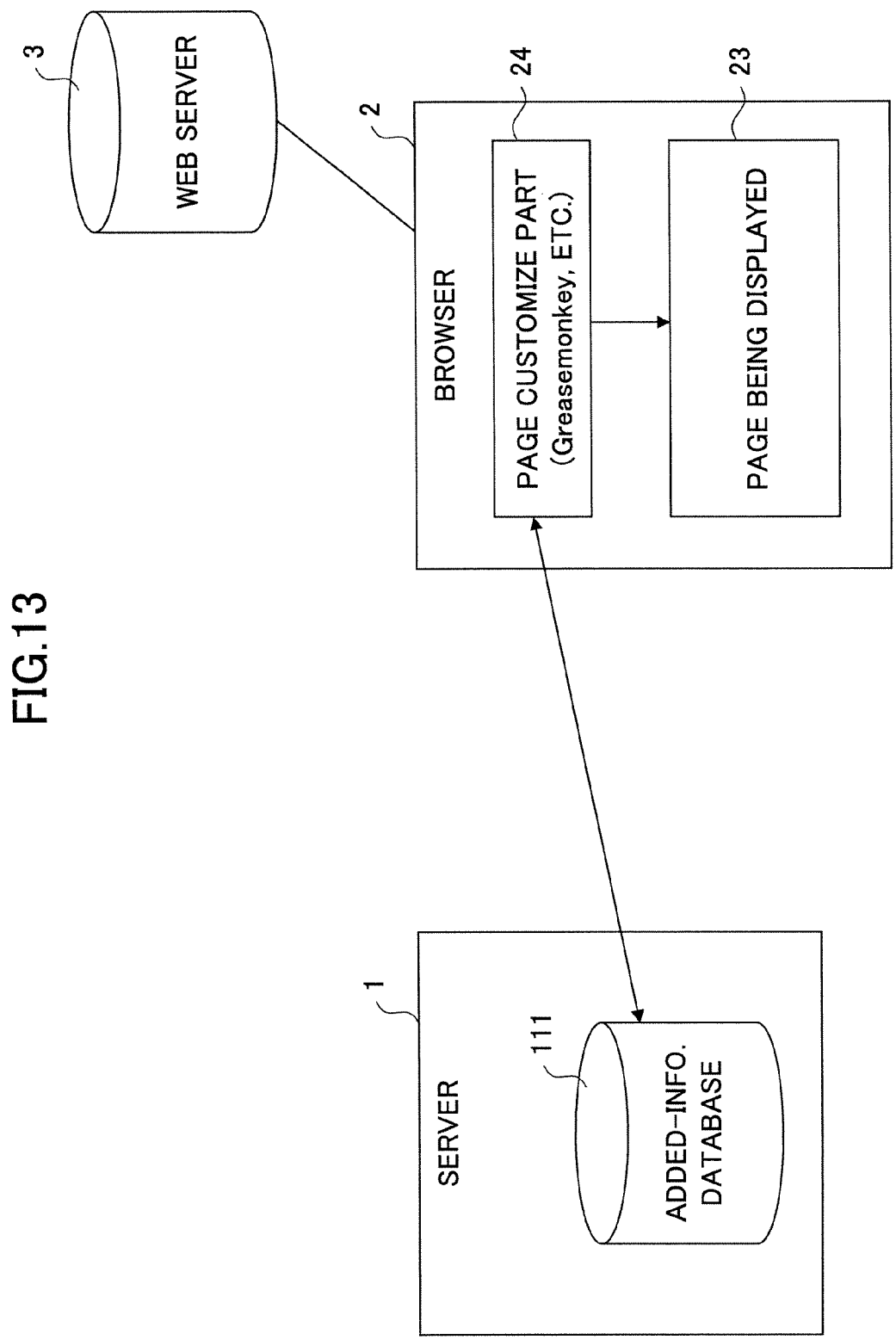
FIG. 13 is a diagram showing another example of the composition of the system at the time of page viewing.

FIG. 13 shows another example of the composition of the system at the time of page viewing.

In the previously described embodiment, the page data which is acquired from the cache database 110 (FIG. 2) of the server 1 is transmitted to the browser 2, and the rendering of the underlining information is performed. In contrast, in the example of FIG. 13, the page data is acquired from the Web server 3 directly, and displaying of the page is performed. Moreover, in the example of FIG. 13, the underlining information is acquired from the added information database 111 of the server 1 in the form of RSS (RDF (Resource Description Framework, Rich Site Summary, Really Simple Syndication) Site Summary) or the like, so that underlines and boxes are added to the page being displayed on the screen 23 by using a page customize part 24 provided in the browser 2. This page customize part 24 may be realized by using the browser extended function, such as "Greasemonkey".

Figure 14:
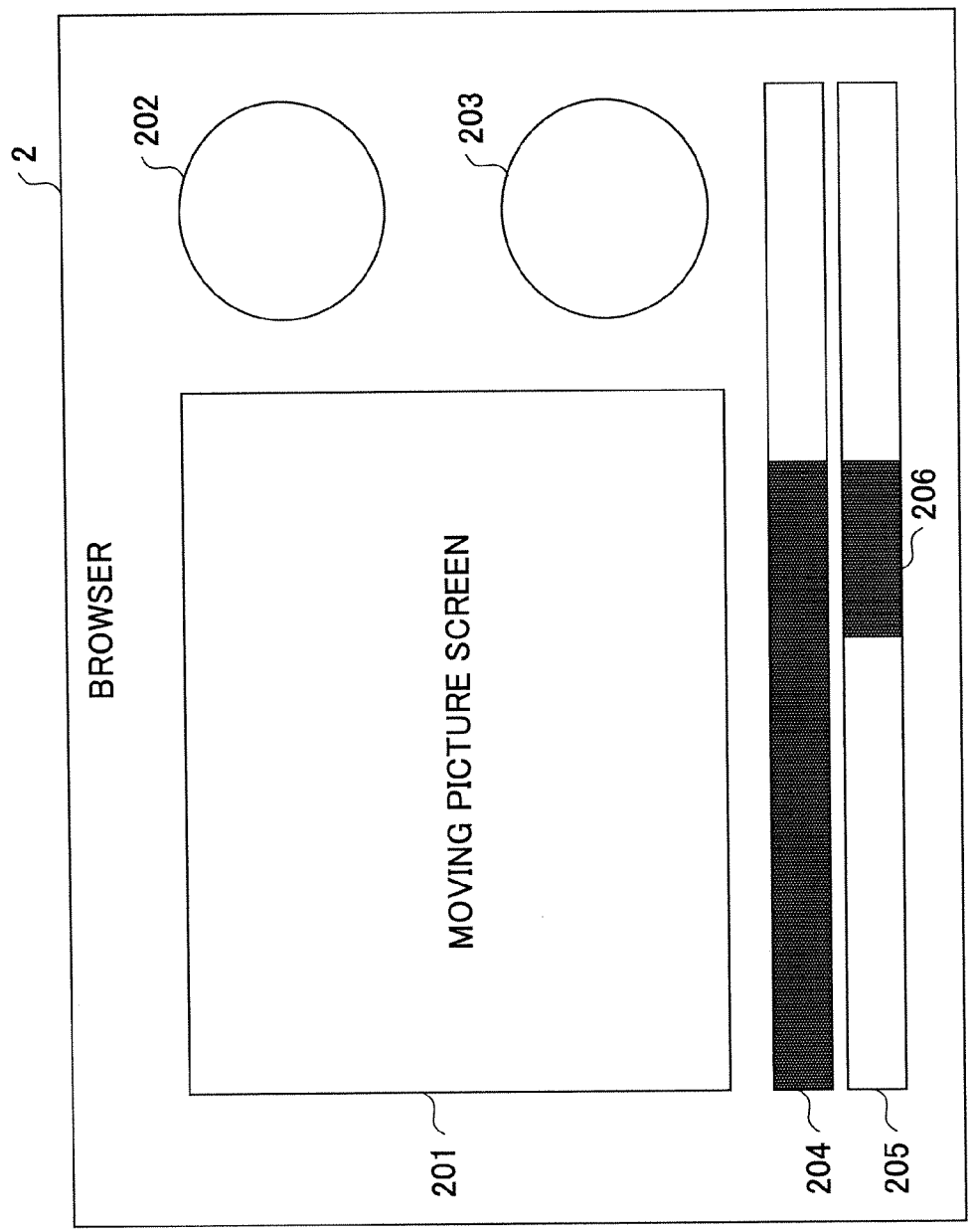
FIG. 14 is a diagram showing an example of range specification for a moving picture.

FIG. 14 shows an example of the range specification for a moving picture.

In the previously described embodiment, the example in which a character string in a Web page is underlined is dealt with. In contrast, in the example of FIG. 14, specifying a desired portion of a moving picture based on the time-axis of the moving picture is possible.

In the example of FIG. 14, the moving picture is displayed on the moving picture screen 201, a play-back start or a play-back stop of the moving picture can be controlled by clicking a play-back start/stop button 202 of the browser 2, and specifying a predetermined portion of the moving picture being reproduced can be performing by clicking a range specification start/end button 203 of the browser 2.

Moreover, in the example of FIG. 14, a play-back time indicator 204 enables the user to check the current playback position, and a range specification indicator 205 enables the user to check the range of the moving picture currently specified. Moreover, dragging the end of a range display portion 206 of the range specification indicator 205 with the mouse enables the user to change the currently specified range of the moving picture.

In the previously described embodiment, marking is attached to the portion to which interest is given by a plurality of users, and the marked portion is shared by a plurality of users. Alternatively, the same system of the previously described embodiment may also be applied to a system in which a draft document is edited by a plurality of users. In such alternative embodiment, the contents of editing to the specified range of the draft document are stored in the added information database 111 (FIG. 2) in the form of a difference. The contents after editing of the range specified are also acquired at the time of registration, and the range in which the underline is drawn is replaced by the acquired contents after editing at the time of rendering.

In the alternative embodiment, how to take measures against the case in which a plurality of edits are given to the same range is important. The measures against the above case can be taken by one of the following options:
(1) priority is given to the first edit;
(2) priority is given to the last edit; or
(3) the previous editing is detected at the time of registration and the previously edited portion is further edited.

A description will be given of the second embodiment of the invention. FIG. 15 shows the composition of a page-added information sharing management system in the second embodiment of the invention.

In the first embodiment mentioned above, the added information is transmitted from the server 1 to the browser 2 and the browser 2 performs the rendering of the added information to the page. In contrast, in this second embodiment, a page data (HTML data) which includes the added information is generated in the server 1 and the generated page data is transmitted from the server 1 to the browser 2, and the browser 2 performs displaying of the page based on the received page data.

As shown in FIG. 15, the page-added information sharing management system includes a server 1 which manages added information, a browser 2 which is operated by the user U, and an external Web server 3 which is the target of page viewing. The server 1, the browser 2, and the Web server 3 are connected via the network, such as the Internet.

The server 1 includes a standard Web server component 101, and a page generating part 103 which generates a detailed page for registration at the time of registration of the added information by the user U.

Moreover, the server 1 includes a user authentication part 105 which manages the information of the users who use the functions of the server 1 and authenticates each user, a request processing part 106 which processes the request from the browser 2, and an information adding part 107 which adds, to the page data, the added information corresponding to the page data with which a request for displaying the page is received, to generate new page data.

Moreover, the server 1 includes a page transmitting part 108+ which transmits the page data to which the added information is attached, to the browser 2, and a user relevance-ratio computing part 109 which computes a user relevance ratio and discovers other users who marked the portion of the page which is similar to that of the current user.

Moreover, the server 1 includes a cache database 110 which holds the page data of the Web page which is the target of registration of the added information, and an added information database 111 which holds the added information. The data which is held by the cache database 110 and the data which is held by the added information database 111 are the same as those shown in FIG. 3 and a description thereof will be omitted.

The browser 2 includes a registration bookmarklet 22 which performs registering of added information, and a screen 23 on which a Web page, etc. is displayed.

The outline of operation of each part of the system of this embodiment at the time of registration of added information and the processing which is performed by the system of this embodiment at the time of registration of added information are the same as those shown in FIG. 4A-FIG. 5B, and a description thereof will be omitted.

Figure 16B:
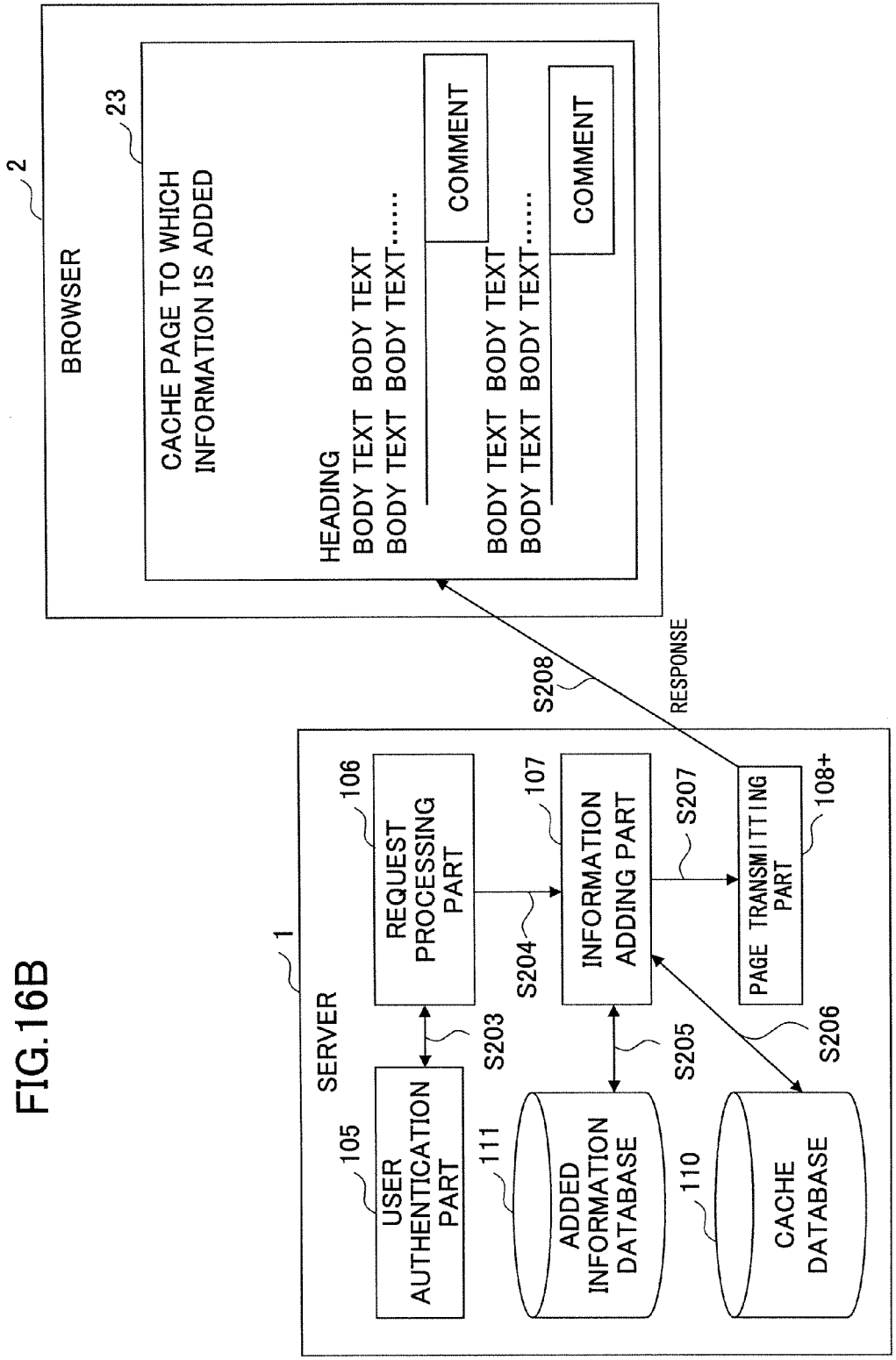

FIG. 16A and FIG. 16B show the outline of operation of each part of the system of this embodiment at the time of page viewing.

As shown in FIG. 16A, when the user U selects the page of a desired article from the top page displayed on the screen 23 of the browser 2 (step S201), the screen 23 transmits a page request to the request processing part 106 of the server 1 by specifying the page (step S202). At this time, the browser 2 collectively transmits the information in the cookie which indicates the user (login user, etc.) of the browser 2.

Subsequently, as shown in FIG. 16B, the request processing part 106 causes the user authentication part 105 to specify the user from the information in the cookie (step S203).

When the user is an authorized user, the request processing part 106 transmits a request for attaching the added information to the page data, to the information adding part 107 (step S204).

In response, the information adding part 107 acquires the added information relevant to the corresponding page, from the added information database 111 (step S205), and acquires the cache data of the corresponding page from the cache database 110 (step S206). And the information adding part 107 generates the page data in which the added information is incorporated, and transmits it to the page transmitting part 108+ (step S207).

The page transmitting part 108+ transmits the received page data to the browser 2 as a response (step S208). And the browser 2 displays the page in which the added information is included, on the screen 23.

Figure 17:
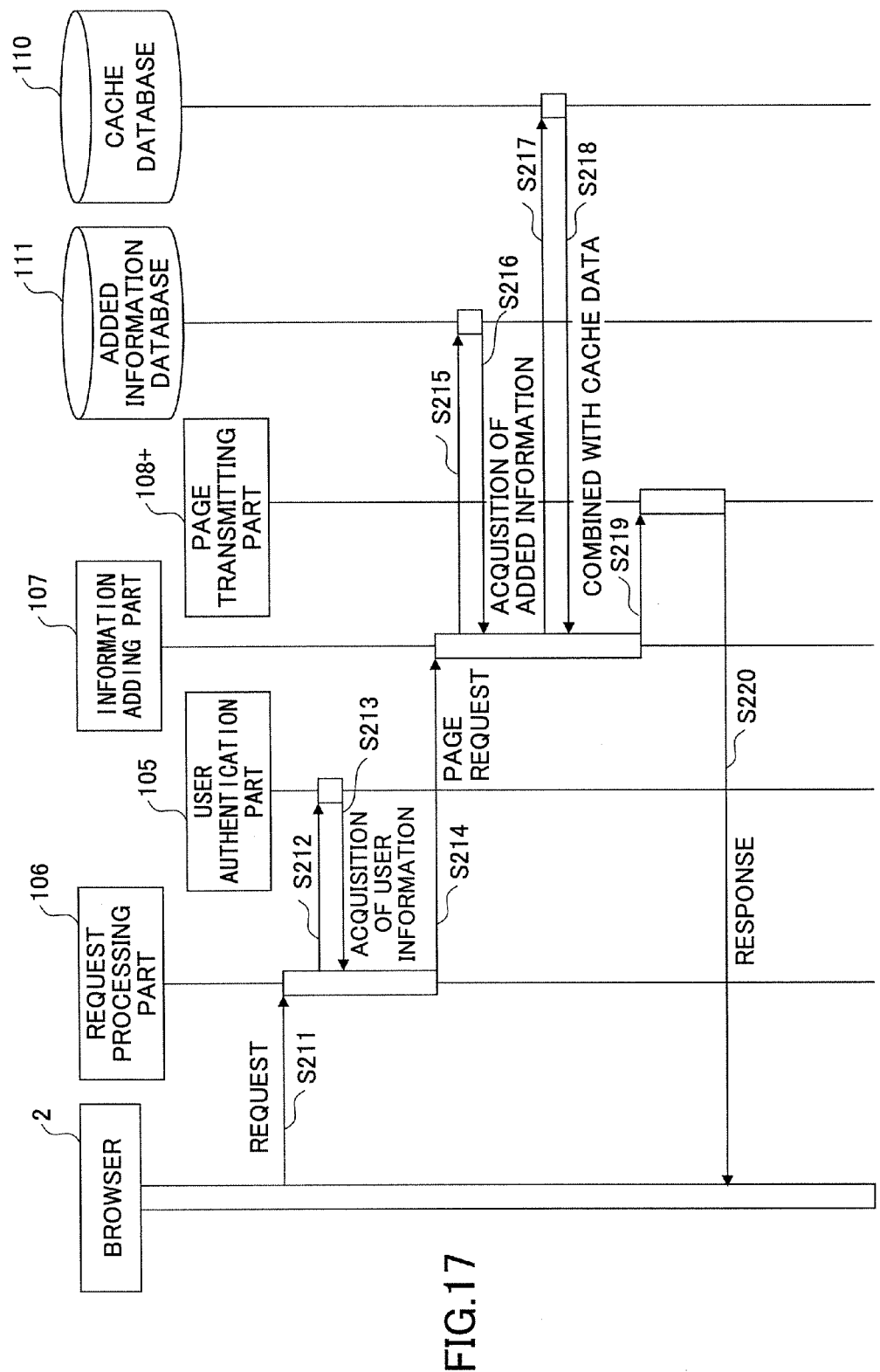
FIG. 17 is a sequence diagram for explaining the processing which is performed at the time of page viewing.

FIG. 17 is a sequence diagram for explaining the processing which is performed at the time of page viewing.

As shown in FIG. 17, the browser 2 transmits a page request to the request processing part 106 of the server 1 by specifying the page according to the page selection by the user U (step S211). At this time, the browser 2 collectively transmits the information in the cookie which indicates the user (login user etc.) of the browser 2.

The request processing part 106 acquires the user information from the user authentication part 105 based on the information in the cookie (steps S212, S213). When the user is an authorized user, the request processing part 106 transmits a page request to the information adding part 107 (step S214).

The information adding part 107 acquires the added information relevant to the corresponding page from the added information database 111 (steps S215, S216), acquires the cache data of the corresponding page from the cache database 110 (steps S217, S218), and combines the contents of the cache data and the added information together to generate the page data in which the added information is incorporated.

And the information adding part 107 transmits the page data incorporating the added information to the page transmitting part 108+ (step S219). The page transmitting part 108+ transmits the received page data to the browser 2 as a response (step S220). In response, the browser 2 displays the page in which the added information is included on the screen 23.

FIG. 18 shows an example of HTML data which is the page to which the added information is attached. In the example of FIG. 18, a description D2 of the added information is inserted in the body element together with a description D1 of the text that is the same as that of the original page, and a description D3 which notifies the user that the system added the added information is further inserted.

A description will be given of the third embodiment of the invention. FIG. 19 shows the composition of a page-added information sharing management system in the third embodiment of the invention.

In the first and second embodiments mentioned above, the single server 1 performs holding and management of added information. In this third embodiment, a plurality of servers 1 (#1, #2, #3, . . . ) are arranged to perform holding and management of added information.

As shown in FIG. 19, the page-added information sharing management system includes a plurality of servers 1 which manage added information, a browser 2 which is operated by the user U, and an external Web server 3 which is the target of page viewing. The server 1, the browser 2, and the Web server 3 are connected via the network, such as the Internet.

Each server 1 includes a standard Web server component 101, a user authentication part 105 which manages the information of the users who use the functions of the server 1 and authenticates each user, a request processing part 106 which processes the request from the browser 2, an added information transmitting part 108 which transmits the added information to the browser 2 in the form of RSS or JSON (JavaScript Object Notation), and an added information database 111 which holds added information. The data which is held by the added information database 111 is the same as that shown in FIG. 3.

The browser 2 includes an added information plug-in 25 which performs registration of the added information to the server 1, acquisition of the added information from the server 1 and rendering of the added information, and a screen 23 on which a Web page, etc. is displayed.

The added information plug-in 25 includes an added information search part 251 which searches for and acquires added information from the plurality of servers 1, an input-form provision part 252 which provides an input form for registration of added information, an added information transmitting part 253 which transmits the added information to the server 1 at the time of inputting the added information, a rendering device 254 which performs rendering of the added information acquired from the server 1, to the page concerned, and a server list 255 which holds the address (URL) of the server 1 to be accessed.

Figure 20A:
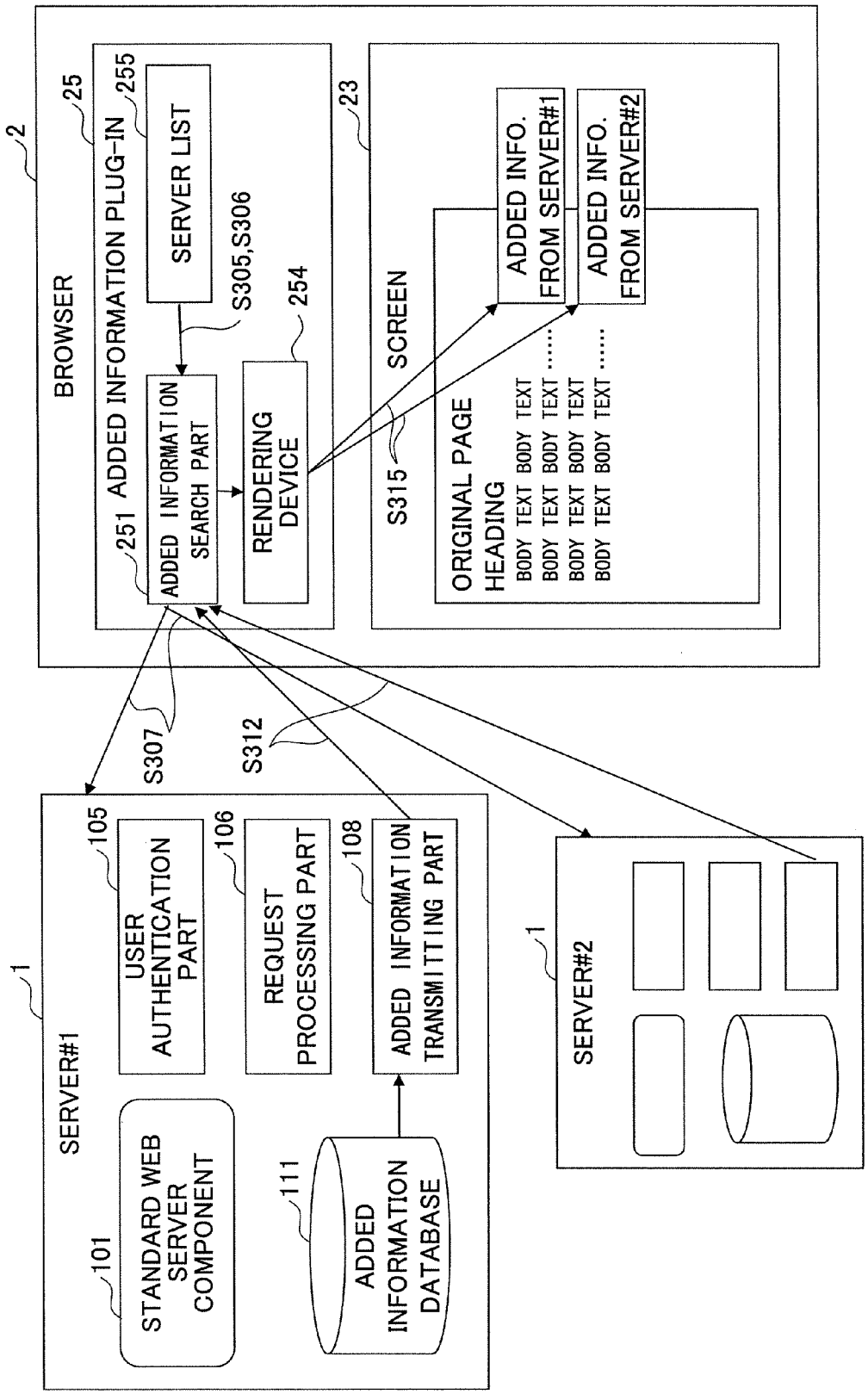

FIG. 20A and FIG. 20B are diagrams for explaining the processing which is performed at the time of page access. FIG. 20A is a diagram showing the outline of operation, and FIG. 20B is a sequence diagram for explaining the processing which is performed by the respective functional parts of the system.

As shown in FIG. 20A and FIG. 20B, when the user U inputs a page request to the browser 2 (step S301), the browser 2 transmits a page request to the Web server 3, and acquires the page data from the Web server 3 (steps S302, S303).

Subsequently, the browser 2 transmits a request of added information to the added information search part 251 of the added information plug-in 25 by specifying the target page (step S304). The added information search part 251 acquires the list of the addresses of the servers 1 from the server list 255 (steps S305, S306).

And the added information search part 251 transmits a request of added information to each server 1 included in the acquired list, by specifying the target page (step S307).

Each server 1 acquires the corresponding added information (if it exists) from the added information database 111 through the added information transmitting part 108, and transmits the acquired added information to the added information search part 251 of the browser 2 (steps S308-S312). If the corresponding added information does not exist, acquisition and transmission of the added information are not performed.

Although it is omitted in the sequence diagram, in advance of acquisition of added information, the user authentication part 105 of each server 1 performs user authentication based on the information in the cookie contained in the request. And when the user is an authorized user, acquisition and transmission of added information are performed.

The added information search part 251 transmits the acquired added information to the browser 2 (step S313). The browser 2 causes the rendering device 254 to perform the rendering of the page data and the added information to the page on the screen 23 (steps S314, S315).

In the above-mentioned embodiment, the rendering of the page data and the added information is collectively performed after acquisition of the added information. Alternatively, the rendering of only the page data may be performed immediately after the page data is acquired from the Web server 3, and subsequently, when the added information is acquired, the rendering of the added information in combination with the page data may be performed.

Figure 21A:
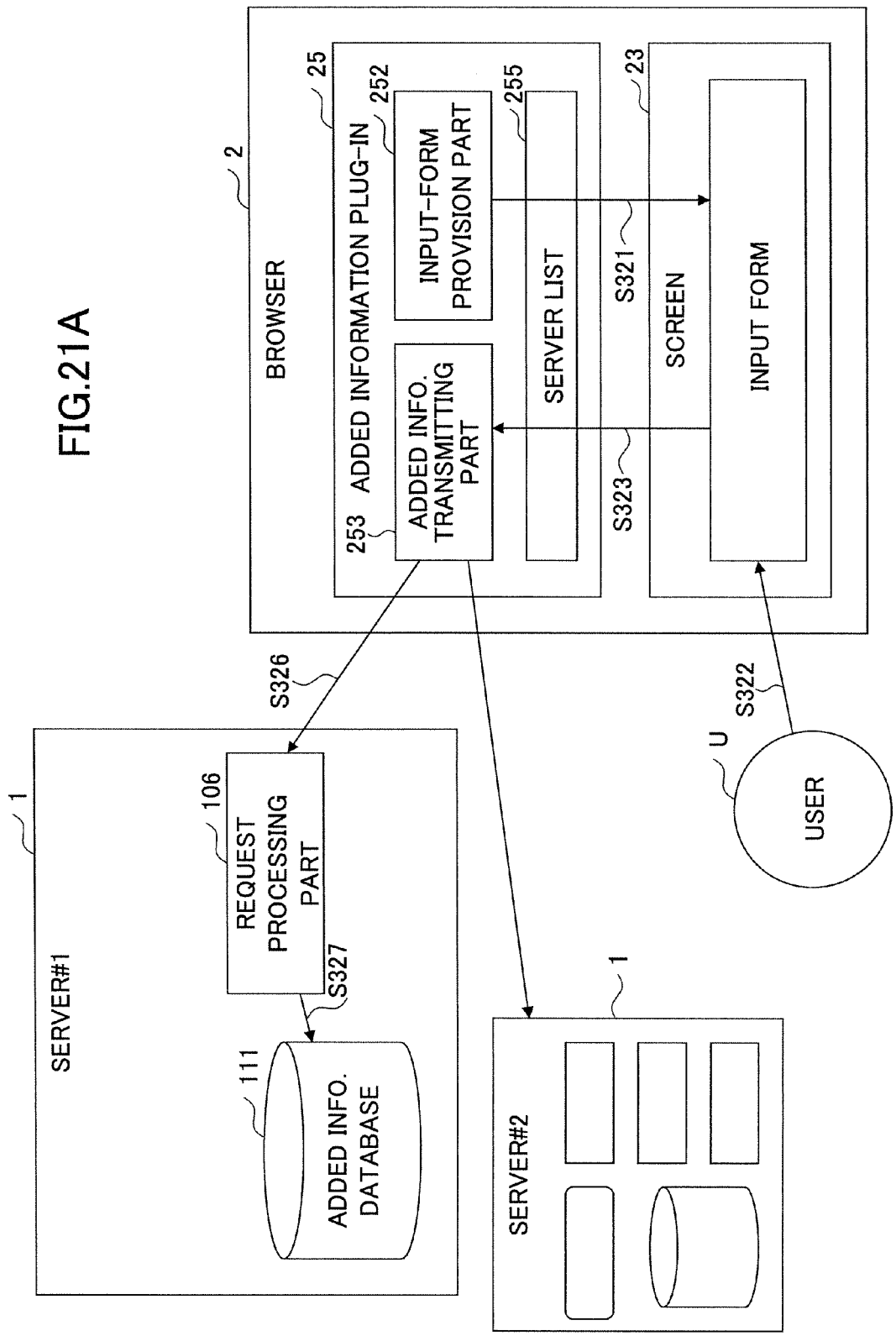

FIG. 21A and FIG. 21B are diagrams for explaining the processing which is performed at the time of added information inputting. FIG. 21A is a diagram showing the outline of operation, and FIG. 21B is a sequence diagram for explaining the processing which is performed by the respective functional parts of the system.

As shown in FIG. 21A and FIG. 21B, after the page of the Web server 3 is displayed, automatically, or according to operation of the user U, the browser 2 causes the input-form provision part 252 of the added information plug-in 25 to display an input form on the screen 23 in an overlaying or pop-up manner (step S321).

And when the user U inputs a range in which the added information is attached, and a comment, if needed, to the input form (step S322), the input form transmits the added information (the range and the comment) to the added information transmitting part 253 (step S323).

In response, the added information transmitting part 253 acquires the list of the servers from the server list 255 (steps S324, S325), and transmits a request for registration of the added information to each server 1 included in the list (step S326).

When the received added information is registered into the added information database 111 (steps S327, S328) and the registration is completed normally in each server 1, it is notified to the added information transmitting part 253 (step S329).

In the above-mentioned embodiment, the added information is registered in each server 1 included in the list acquired from the server list 255, and the search probability of the added information can be raised. However, the duplicate added information may exist in the system. In order to obviate the problem, registration of added information may be limited to a predetermined server 1 in the list.

For example, the above-mentioned embodiment may be modified so that, when registration of added information is performed in the highest-rank server 1 in the list and the registration is not completed normally, the registration is performed in the following-rank server 1, and if the registration is completed normally, the processing is terminated.

Figure 22:
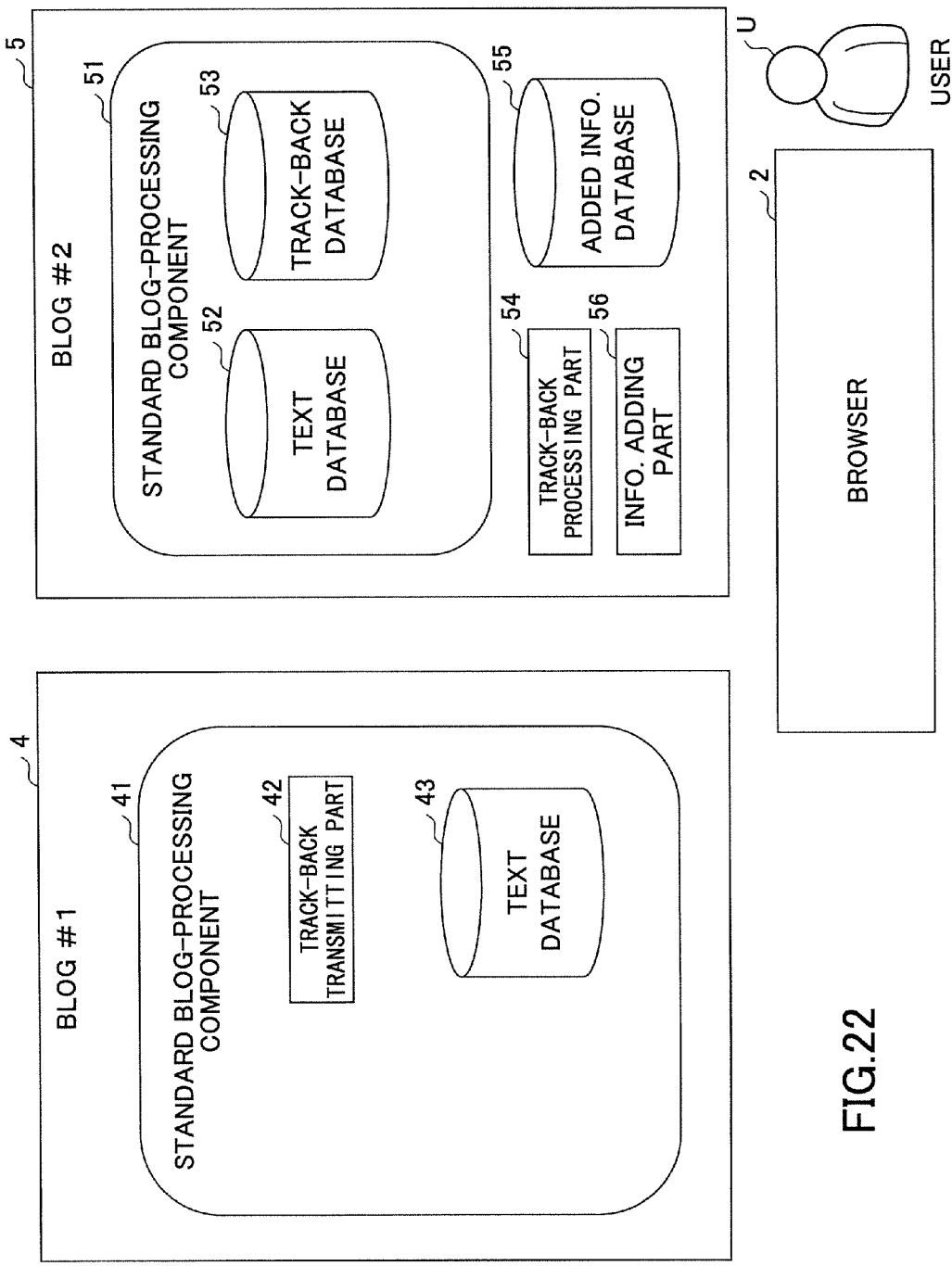
FIG. 22 is a block diagram showing the composition of a page-added information sharing management system in the fourth embodiment of the invention.

A description will be given of the fourth embodiment of the invention. FIG. 22 shows the composition of a page-added information sharing management system in the fourth embodiment of the invention.

In this fourth embodiment, the invention is applied to a blog (a diary-like site). The added information is registered into the blog by using the track-back mechanism (see http://lowlife.jp/yasusii/stories/8.html for details), and at the time of blog viewing, the added information is combined with the blog so that the combined blog is displayed.

As shown in FIG. 22, the page-added information sharing management system includes a normal blog 4 (blog#1), a blog 5 (blog#2) to which the invention is applied, and a browser 2 which is operated by the user U. The blog 4, the blog 5, and the browser 2 are connected via the network, such as the Internet. In this embodiment, suppose that the track-back is transmitted from the blog 4 to the blog 5 and the blog 5 is viewed from the browser 2.

The blog 4 includes a standard blog processing component 41. And the standard blog processing component 41 includes a track-back transmitting part 42 which transmits the track-back to another blog, and a text database 43 which holds the contents of articles of the blog 4.

The blog 5 includes a standard blog processing component 51, a track-back processing part 54 which receives the track-back from another blog and processes registration of added information etc., an added information database 55 which holds added information (the contents of the data held by the database 55 is the same as that shown in FIG. 3), and an information adding part 56 which attaches the added information to the contents of the blog at the time of blog viewing.

The standard blog processing component 51 includes a text database 52 which holds the contents of articles of the blog 5, and a track-back database 53 which holds the information of the track-back received.

In this embodiment, a set of tags specific to the added information is defined beforehand, and using the tags, the added information is embedded beforehand in the track-back article of the blog 4 which transmits the track-back to the blog 5. The blog 5, which receives the track-back from the blog 4, makes reference to the track-back article of the blog 4, acquires the added information based on the tags specific to the added information, and performs registration of the added information.

Figure 23A:
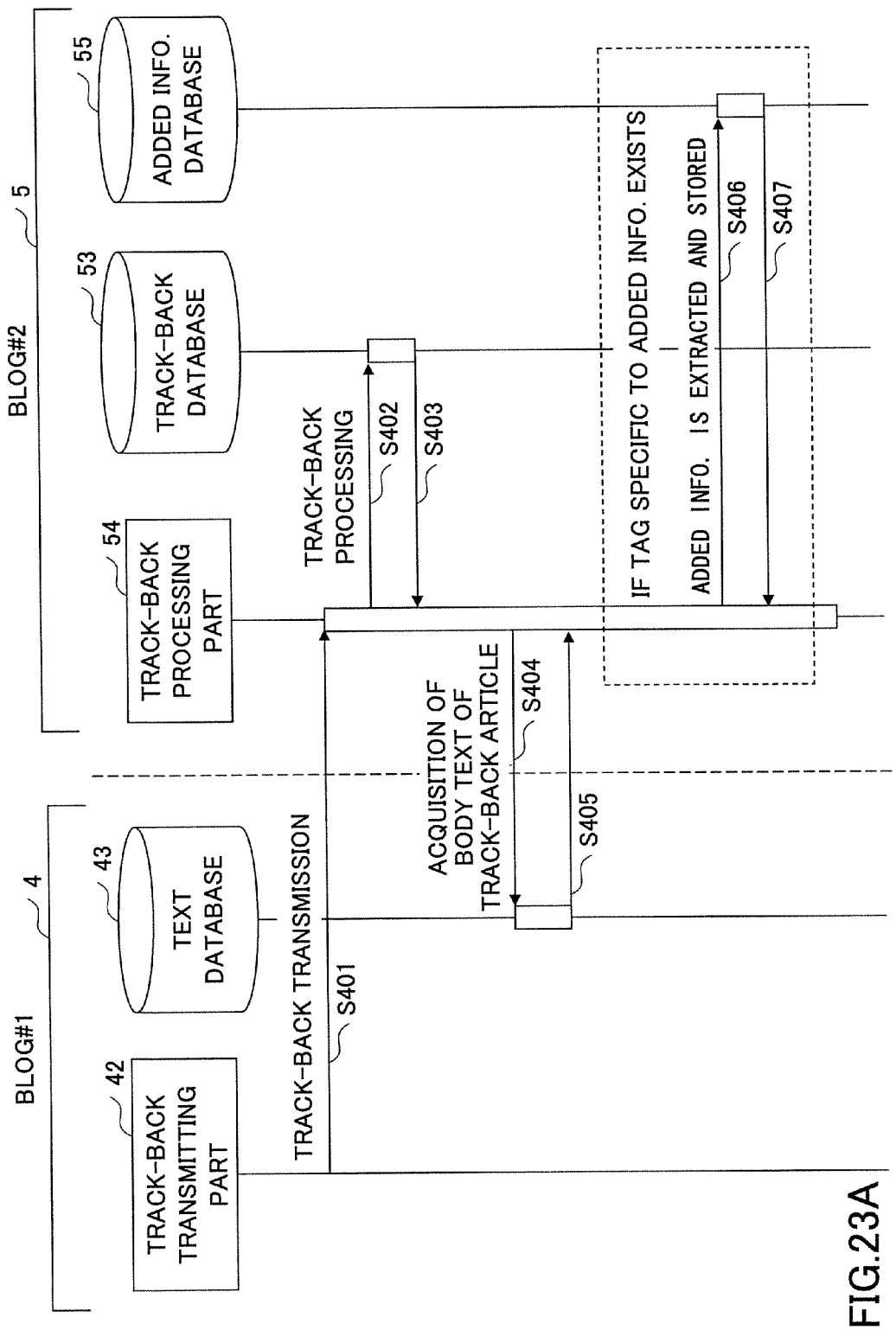

FIG. 23A is a sequence diagram for explaining the processing which is performed at the time of track-back transmission.

As shown in FIG. 23A, when the track-back is transmitted from the track-back transmitting part 42 to the blog 5 according to operation of the user of the blog 4 (step S401), the track-back is received by the track-back processing part 54 of the blog 5.

FIG. 23B shows an example of the contents of the articles of the blog 4 and the blog 5 at the time of track-back transmission.

As shown in FIG. 23B, in the track-back article of the blog 4, which transmits the track-back to the article (original page) of the blog 5, the underline ranges and the comments are described beforehand by means of the tags (specific to the added information): "<socialunderline:range>"; "</socialunderline:range>"; "<socialunderline:comment>"; and "</socialunderline:comment>". Namely, with respect to the contents of the original article of the blog 5, the statement interposed between the tag "<socialunderline:range>" and the tag </socialunderline:range>" in the track-back article of the blog 4 indicates the range of the original article in which an underline should be drawn, and the statement interposed between the tag "<socialunderline:comment>" and the tag </socialunderline:comment"> in the track-back article of the blog 4 indicates the comment which should be attached to the original article.

Referring back to FIG. 23A, the track-back processing part 54 which has received the track-back stores the track-back information in the track-back database 53, and performs track-back processing for displaying a track-back list (steps S402, S403).

Subsequently, the track-back processing part 54 accesses the blog 4 of the track-back source and acquires the text of the track-back article from the text database 43 (steps S404, S405).

And when the tags specific to the added information are contained in the acquired text of the track-back article, the track-back processing part 54 extracts the added information and registers it in the added information database 55 (steps S406, S407).

When the user who is allowed to register added information is restricted, a user identification is performed from the URL of the blog 4 of the track-back source, and it may be determined whether registration processing should be performed continuously.

FIG. 24A is a sequence diagram for explaining the processing which is performed at the time of blog viewing.

As shown in FIG. 24A, when a request for displaying a page is transmitted to the blog 5 from the browser 2 according to operation of the user U (step S411), the information adding part 56 of the blog 5 carries out rendering processing of the page which includes acquisition of the contents of the text from the text database 52 (steps S412, S413), acquisition of the track-back information from the track-back database 53 (steps S414, S415), and the rendering of the page (step S416).

Subsequently, the information adding part 56 acquires the added information from the added information database 55 (steps S417, S418) and performs the rendering of the added information to the page (step S419).

Figure 24B:
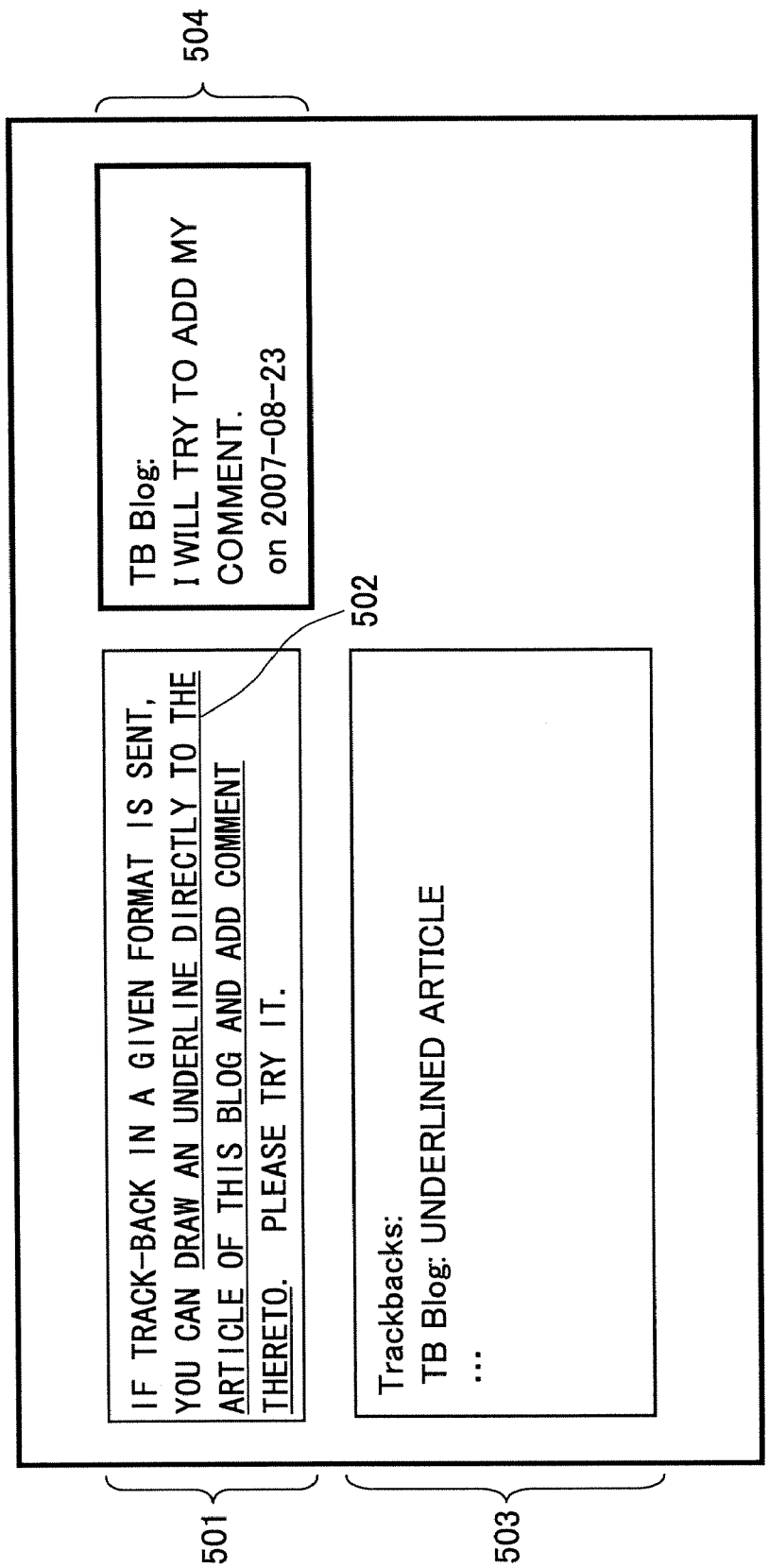

FIG. 24B shows an example of a displayed screen of the article of the blog 5 in the browser 2. As shown in FIG. 24B, the underline 502 which is attached to a specific portion of the body text 501, and the comment 504 which is attached to that underlined portion are displayed on the screen. The column 503 is an area in which the track-back information is displayed.

The present invention is not limited to the above-described embodiments, and variations and modifications may be made without departing from the scope of the present invention.

The present application is based on and claims the benefit of priority of Japanese patent application No. 2006-278080, filed on Oct. 11, 2006, and Japanese patent application No. 2007-245526, filed on Sep. 21, 2007, the entire contents of which are hereby incorporated by reference.

What is claimed is:

1. A page-added information sharing management method comprising:
    receiving, at a processing apparatus, a setting of added information to an object in a page, including a range specification of the added information for the object;
    storing, in a memory device, the added information by associating the added information with the page;
    determining, at the processing apparatus, a relevance ratio of plural users, with respect to the page, to which the added information was attached to the page by the plural users, wherein the determining includes calculating a ratio of a range specification of the added information provided by a first user and a range specification of the added information provided by a second user; and
    acquiring, at the processing apparatus, when a request for displaying the added information is received, the added information associated with the page to be viewed, to provide a requesting device with the added information.

2. The page-added information sharing management method according to claim 1, further comprising:
    providing a browser with a script which includes data of the page to be viewed and causes the browser to perform an acquisition request of the added information and a rendering of the acquired added information before the browser performs page viewing.

3. The page-added information sharing management method according to claim 1, further comprising:
    combining the added information with the data of the page being viewed, to provide the requesting device with the page data with which the added information is combined.

4. The page-added information sharing management method according to claim 1, further comprising:
    storing a cache data of the page in which the added information is set; and
    providing the cache data of the page when a request for viewing the page is received.

5. The page-added information sharing management method according to claim 1, wherein the acquiring the added information includes acquiring the added information from a track-back article received from an external device which performs track-back transmission, based on a predetermined tag.

6. The page-added information sharing management method according to claim 1, further comprising:
    displaying a list of users having relevance ratios larger than a given value.

7. The page-added information sharing management method according to claim 1, wherein the object is a character string and the range specification is generated by specifying a starting-position character string to indicate a starting position of a range and an end-position character string to indicate an end position of the range.

8. The page-added information sharing management method according to claim 1, wherein the object is a character string and the range specification is generated by specifying an element of a document described in a markup language.

9. The method of claim 1, wherein the processing apparatus is a server, and the method further comprises:
    receiving, at the server, a request for the page from the requesting device;

transmitting, at the server, the page and a script to the requesting device, wherein the script causes the requesting device to send a request for the added information to the server; and transmitting, at the server, the added information to the requesting device in response to the request for the added information, wherein the script further causes the requesting device to create a display combining the added information and the page.

10. The method of claim 9, wherein the page is a web page, and the transmitting includes transmitting a cached version of the web page.

11. The method of claim 1, wherein the added information includes adding underlining and comments to the object in the page.

12. A page-added information sharing management device comprising:
  a network interface configured to communicatively connect the page-added information sharing management device to a network including a requesting device;
  a receiving unit configured to receive, through the network interface, a setting of added information to an object in a page, including a range specification of the added information for the object;
  a memory device configured to store the added information by associating the added information with the page;
  a user relevance-ratio computing part configured to determine a relevance ratio of plural users, with respect to the page, to which the added information was attached to the page by the plural users, wherein the user relevance-ratio computing part calculates a ratio of a range specification of the added information provided by a first user and a range specification of the added information provided by a second user; and
  a providing unit configured to acquire, when a request for displaying the added information is received through the network interface, the added information associated with the page to be viewed, to provide the requesting device with the added information.

13. The page-added information sharing management device according to claim 12, further comprising a transmitting unit configured to provide a browser with a script which includes data of the page to be viewed and causes the browser to perform an acquisition request of the added information and a rendering of the acquired added information before the browser performs page viewing.

14. The page-added information sharing management device according to claim 12, further comprising an information adding part configured to combine the added information with the data of the page being viewed, to provide a requesting device with the page data with which the added information is combined.

15. The page-added information sharing management device according to claim 12, further comprising:
  a storage unit configured to store a cache data of a page in which the added information is set; and
  a transmitting unit configured to provide the cache data of the page when a request for viewing the page is received.

16. The page-added information sharing management device according to claim 9, wherein the receiving unit is arranged to acquire the added information from a track-back article received from an external device which performs track-back transmission, based on a predetermined tag.

17. The page-added information sharing management device according to claim 12, wherein the user relevance-ratio computing part is configured to generate a display of a list of users having a relevance ratio larger than a given value.

* * * * *